US011909144B2

(12) United States Patent
Narumi et al.

(10) Patent No.: US 11,909,144 B2
(45) Date of Patent: Feb. 20, 2024

(54) SOCKET

(71) Applicant: Enplas Corporation, Saitama (JP)

(72) Inventors: Keiichi Narumi, Santa Clara, CA (US); Kazutaka Koshiishi, Saitama (JP)

(73) Assignee: Enplas Corporation, Saitama (JP)

( * ) Notice: Subject to any disclaimer, the term of this patent is extended or adjusted under 35 U.S.C. 154(b) by 47 days.

(21) Appl. No.: 17/514,151

(22) Filed: Oct. 29, 2021

(65) Prior Publication Data

US 2022/0294162 A1 Sep. 15, 2022

Related U.S. Application Data

(60) Provisional application No. 63/178,015, filed on Apr. 22, 2021, provisional application No. 63/172,222, filed on Apr. 8, 2021, provisional application No. 63/159,054, filed on Mar. 10, 2021.

(51) Int. Cl.

| | |
|---|---|
| ***H01R 13/24*** | (2006.01) |
| ***H01R 13/6599*** | (2011.01) |
| ***H01R 12/71*** | (2011.01) |
| ***H01R 13/6588*** | (2011.01) |
| ***H01R 13/15*** | (2006.01) |

(52) U.S. Cl.

CPC ....... *H01R 13/6599* (2013.01); *H01R 12/716* (2013.01); *H01R 13/15* (2013.01); *H01R 13/6588* (2013.01); *H01R 2201/20* (2013.01)

(58) Field of Classification Search

CPC .............. H01R 13/6599; H01R 12/716; H01R 13/15; H01R 13/6588; H01R 2201/20; H01R 13/6461; H01R 12/714; H01R 12/73; H01R 13/24

See application file for complete search history.

(56) References Cited

U.S. PATENT DOCUMENTS

| | | | | |
|---|---|---|---|---|
| 8,758,067 B2 * | 6/2014 | Rathburn | H01R 12/716 | 439/700 |
| 2011/0171841 A1 * | 7/2011 | Tsubaki | H01R 12/7076 | 439/81 |
| 2012/0115366 A1 * | 5/2012 | Suzuki | G01R 1/07314 | 439/626 |
| 2012/0164888 A1 * | 6/2012 | Rathburn | H05K 7/1069 | 29/829 |
| 2012/0171907 A1 * | 7/2012 | Rathburn | H05K 1/141 | 439/700 |
| 2013/0065455 A1 * | 3/2013 | Kawata | H01R 13/2421 | 439/700 |
| 2014/0242816 A1 * | 8/2014 | Rathburn | H01R 12/52 | 29/874 |
| 2019/0148858 A1 * | 5/2019 | Mason | H01R 13/111 | 439/67 |
| 2021/0351535 A1 * | 11/2021 | Franco Núñez | H01R 12/714 | |
| 2021/0399196 A1 * | 12/2021 | Kikuchi | H01R 12/714 | |

* cited by examiner

*Primary Examiner* — Abdullah A Riyami
*Assistant Examiner* — Nelson R. Burgos-Guntin
(74) *Attorney, Agent, or Firm* — Shih IP Law Group, PLLC

(57) ABSTRACT

A socket for electrically connecting an upper first part and a lower second part, the socket includes: a pin that contacts the first part and the second part; a main body made of a non-conductive material; a holder that penetrates the main body vertically and holds the pin; and a conductive layer provided on an inner circumferential surface of the holder to surround the pin.

18 Claims, 44 Drawing Sheets

300

300

300

500a

700

700

Gold coating

Copper laminate

SOCKET

CROSS REFERENCE TO RELATED APPLICATIONS

This application is entitled to and claims the benefit of U.S. provisional application Ser. No. 63/159,054 filed on Mar. 10, 2021, Ser. No. 63/172,222 filed on Apr. 8, 2021, and Ser. No. 63/178,015 filed on Apr. 22, 2021, the disclosure of which including the specification, drawings and abstract is incorporated herein by reference in its entirety.

TECHNICAL FIELD

Embodiments disclosed herein generally relate to a socket for a semiconductor testing system.

BACKGROUND ART

Testing a semiconductor device includes an electrical characteristics test. The electrical characteristics test is performed by placing a tested device in a housing that connects to an integrated circuit. Generated electric signals flow through contact pins located between the circuit board and the tested device.

The development of a semiconductor testing device has been a tag-war between the preservation of signal integrity and the improved functionality of device. On one hand, the desired level of the functionality of integrated circuit is constantly rising. Integrated circuits need to deliver a higher-speed electrical signal processing rate and handle a greater number of transmitted electrical signals. It is not uncommon to test a hundred or more devices a minute. On the other hand, the integrity or the quality of electrical signals should not be compromised.

Spring coil pins are predominantly used in today's device testers. Contact pin housings are typically implemented as an array of double-ended and single ended spring-covered pins, by which electrical signals are vertically transferred. Unshielded spring pins were previously used for both signal transmission and grounding. Sockets are supposed to have low-resistance, transient, non-destructive electrical contacts with tested devices to optimize signal transmission and testing. As higher-frequency electrical signals have become routine, needs for contact pins with a narrowly controlled characteristic impedance have been intensified. In addition, as higher-frequency electrical signals have become routine, one socket may accommodate hundreds of contact pins.

Additionally, to meet the currently required level of high-frequency transmission, the number of terminals in an integrated circuit socket has increased. Combined with the market trend to reduce the size of integrated circuits, the terminal pitch and the space for contact pins have been significantly reduced. In addition, combined with the market trend to reduce the size of integrated circuits, contact pins need to be produced in much smaller sizes. Also, the entire surface area for contact pins has declined. The decreased distance between neighboring signal transmitting contact pins has caused signal distortions, commonly known "cross-talk" effects. Moreover, recent contact pins are designed to have lengthier springs, along with contacts, which generates parasitic effects that affect signal transmissions, and causes electrical performance deteriorations.

When a high-frequency transmission above 10 GHz is contemplated, in order to achieve well-controlled signal integrity and higher signal transmission for the entire body of the housing, a coaxial pin housing has been developed. In traditional coaxial pins, central spring pins are concentrically arranged in a conductive tube. The central spring pin and the conductive tube are distanced to realize a well-controlled and substantially constant characteristic impedance over the height of the pin socket (housing). The co-axial pin socket (housing) has largely resolved problems related to stray capacitance and stray inductance.

In making contact pin socket (housing), a person of ordinary skill in the art can employ molded insulating PCB-type materials that are conventionally used for integrated circuits. A person with ordinary skill may compose a pin socket (housing) by providing copper alloy on a surface of the socket (housing). Subsequently, the socket (housing) may be processed in a reflow oven to attach solder balls to contact pins. Contact pads may be printed into the socket (housing), and solder balls are brought into registration with contact pads. The socket (housing) holds spring pins in place and electrically couples integrated circuit terminals with pin terminals.

Those soldered have been going out of favor because of the lack of mobility, and the containment of lead, a pollutant and a health hazard. Additionally, the high-speed data transmission is complicated by the crosstalk between signaling pins of the socket (housing). Moreover, the achievement of a narrowly controlled characteristic impedance is troubled because of the electromagnetic disturbances of pins and the integrated circuit by conductive components of the socket (housing). For example, a conductive layer has been routinely formed by application of copper (Cu) clad laminate. However, because copper is subject to electro-migration, such pin socket (housing) may allow electrical signal distortion.

As a solution to these problems, U.S. Provisional Application 63/159,054 entitled "Enhanced Semiconductor Testing System" Narumi, et al. disclosed a coaxial pin socket which employs conductive material coating over a dielectric foundation. Gold is one of the most desired materials for plating because of its stability and unique electric and optical properties.

Metal-plated IC sockets have been manufactured predominantly by electrodeposition. Plating of an IC socket with gold by electrodeposition requires a strict regulation of the environment, tightly controlled parameters. For instance, plating processes may be influenced by geometric factors, cathode polarisation, current density, pH swings, and byproduct accumulations. Numerous inspections may be necessary to achieve an intended thickness. A high-quality gold coated socket has been difficult to mass-produce.

It is thus, being proposed to efficiently produce a coaxial pin socket with narrowly controlled signal integrity during testing of IC devices.

In newer coaxial pin socket (housing), impedance-controlled signal pins and ground pins are placed in a partially insulated metal socket (housing). However, careful examinations have found out the significant level of crosstalk between metal socket (housing) and integrated circuit that had not existed in conventional socket (housing) made of plastic. This unique crosstalk causes impaired signal transfers even if pins are perfectly impedance controlled. In addition, presently available coaxial pin socket (housing) is quite expensive, given that coaxial pin socket (housing) is constructed from layers of thin metal plates and miniature insulation sleeves to hold the contact pin in.

It is thus, being proposed to structure a coaxial pin housing with a gold-plated frame to minimize crosstalk effects among components of different electrical conductivity and to deliver a system with strictly tailored characteristic impedance.

Another problem in high-frequency integrated circuits is a mechanical issue related to preload bearing. Preload is placed on sockets to effectuate a reliable contact between a contact pin's terminal and a tested device's receptor. Even if the pressure on one pin is only 20 to 50 grams, the pressure accumulates to several kilos to control all contacts housed in a socket. In addition, because high-frequency signals demand a smaller socket and a thinner divider for neighboring contact pins, the socket's stress bearing ability has been sacrificed. If a socket bends, its dimensional relationships and electrical features are distorted. Accordingly, manufacturers of recent testers must prevent the socket's tendency to bow.

It is thus, being proposed to structure a coaxial pin socket with a conductive material-plated sockets to minimize cross-talk effects among components of different electrical conductivity, minimize a risk of short circuit, prevent the socket's bowing, and enhance the signal integrity during testing.

SUMMARY OF INVENTION

Technical Problem

The present invention obviates the above-mentioned disadvantages by providing an improved socket.

Solution to Problem

A socket according to an embodiment of the present invention is for, when in use, electrically connecting an upper first part and a lower second part. The socket includes: a pin that contacts the first part and the second part; a main body made of a non-conductive material; a holder that penetrates the main body vertically and holds the pin; and a conductive layer provided on an inner circumferential surface of the holder to surround the pin.

In one embodiment, a system for testing a semiconductor device includes a housing with vertically patent holes and pins, when one or more layers of the housing are coated with a conductive material, when the vertically patent holes are coated with a conductive material, when the housing is made of a dielectric material, and when the conductive material coating is spared in the immediate proximity of two ends of signal pins. In one embodiment, a method of making a housing and a pin comprises: creating a first hole for a signal pin and a second hole for a ground pin in the housing; adding conductive coating to top planes of a first group of layers and bottom planes of a second group of layers of the housing; adding conductive coating to interiors of the first hole and the second hole in a third group of layers; storing the signal pin in the first hole and the ground pin in the second hole; positioning all layers of the housing to attach the signal pin to a corresponding receptor of a tested device, when the housing is made of a dielectric material, and the conductive coating being spared in the proximity of two ends of the signal pin to prevent a short circuit.

In one embodiment, a socket to store a spring-covered pin for testing a device, comprising: a first plate; and a second plate, wherein the socket is made of a dielectric base; wherein the socket is pierced by vertically patent holes to store pins; wherein, with the device placed on the socket, the first plate and the second plate extend vertically stored pins' top to bottom; wherein the stored pins are suspended in an upright position directly by the first plate and the second plate; wherein the first plate and the second plate are coated with a conductive material; and wherein the conductive material coating is spared in the proximity of two ends of signal pins and two ends of power pins that are stored in the socket. In one embodiment, a socket to store spring-covered pins for testing a device, comprising: two or more dielectric plates; and conductive material coating over the two or more dielectric plates; wherein the socket is pierced by vertically patent holes for pins; wherein the two or more dielectric plates suspend the pins; wherein the lowest of the two or more dielectric plates can be thinner than 0.2 mm, and wherein the conductive material coating is spared in the proximity of two ends of signal pins and two ends of power pins. In one embodiment, the lowest of the two or more dielectric plate is made from Flexible Circuit Board. In one embodiment, a method of making a socket for accommodating a device comprises: creating vertically patent holes for pins in the socket; coating two or more layers of the socket with a conductive material; and positioning the socket to reversibly attach the pins to corresponding receptors of the device, wherein the socket is dielectric, wherein conductive coating is spared in the proximity of two ends of signal pins and two ends of power pins to prevent a short circuit, wherein, with the device placed on the socket, the two or more layers extend vertically stored pins' top to bottom, wherein the lowest of the two or more layers can be thinner than 0.2 mm, and wherein the stored pins are suspended in an upright position directly by the two or more layers.

In one embodiment, an IC socket to store a spring-covered pin for testing a device, comprising: a first plate; and a second plate, wherein the first plate is laid above the second plate to form the IC socket, wherein the IC socket is pierced by vertically patent holes to store pins; wherein, with the device placed on the IC socket, the first plate's top portion extends vertically up to the stored pins' top portion and the second plate's lower end lies above the stored pins' bottom; wherein the first plate and the second plate are covered with copper laminate films; wherein gold is plated on the copper laminate films on the first plate and the second plate, wherein conductive material is spared in the proximity of two ends of signal pins and two ends of power pins that are stored in the socket.

In one embodiment, an IC socket for testing a semiconductor device includes: one or more layers; vertically patent holes for storing pins; and copper laminate films, wherein the copper laminate films are applied to top planes and bottom planes of the one or more layers; wherein gold is plated on the copper laminate films, wherein metal is spared in the proximity of two ends of signal pins and two ends of power pins.

In one embodiment, a method of making an IC socket for testing a device comprises: creating vertically patent holes for storing pins in the IC socket; forming copper laminate films over layers of the IC socket; plating the copper laminate films with gold; and positioning the IC socket to reversibly attach the pins to corresponding receptors of the device, wherein metal is spared in the proximity of two ends of signal pins and two ends of power pins.

In one embodiment, a method of making an IC socket for testing a device comprises: creating a first hole for a signal pin and a second hole for a ground pin in the IC socket; forming copper laminate films over top and bottom planes of a first group of layers of the IC socket; forming copper laminate films over the first hole and the second hole of a second group of layers of the IC socket; plating the copper laminate films with gold; storing the signal pin in the first hole and the ground pin in the second hole; positioning all layers of the IC socket to attach the signal pin to a corresponding receptor of the device, wherein metal coating is spared in the proximity of two ends of the signal pin and two ends of a power pin to prevent a short circuit.

BRIEF DESCRIPTION OF DRAWINGS

Embodiments are described hereinafter with references to the accompanying drawings. The drawings are not drawn to scale. Any proportional features, relations of thickness to planar dimensions, and the ratio of thicknesses of different layers do not indicate actual measurements. Further, directional terms such as up, down, left, and right are used in a relative context on assumption that a testing device is set over a printed circuit board.

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIGS. 1 through 8 show examples of a system for semiconductor testing, a part or a whole of a shielded coaxial pin housing, and pins.

FIG. 1 is a plan view of a layer in the middle section of a housing.

FIG. 2 is a partial vertical cross-sectional view of the housing with pins, schematically illustrating one embodiment.

FIG. 8 is a partial enlarged view of the housing with pins, schematically illustrating one embodiment.

FIGS. 10 through 16 show examples of a system for semiconductor testing, a part or a whole of a shielded socket, and pins.

FIG. 10 is a plan view of a middle layer of a socket.

FIG. 11 is a partial vertical cross-sectional view of the socket with a pin, schematically illustrating prior art.

FIG. 12 is a partial vertical cross-sectional view of the socket with a pin, schematically illustrating one embodiment.

FIG. 15 is a partial vertical cross-sectional view of the socket with a pin, schematically illustrating one embodiment.

FIGS. 17 through 22 show examples of a system for semiconductor testing, a part or a whole of an improved shielded IC socket, and pins.

FIG. 17 is a plan view of a middle layer of a socket.

FIG. 19 is a partial vertical cross-sectional view of the socket with a pin, schematically illustrating one embodiment.

FIG. 20A is an exploded plan view of a layer with copper laminate films.

FIG. 20B is an exploded bottom view of the same layer.

FIG. 20C is an exploded perspective view of a dissection of the same layer.

FIG. 20D is an exploded plan view of the layer coated with gold.

FIG. 20E is an exploded bottom view of the same layer.

FIG. 20F is an exploded perspective view of a dissection of the same layer.

FIG. 20G is an exploded plan view of the layer with a hole for a pin.

FIG. 20H is an exploded bottom view of the same layer.

FIG. 20I is an exploded perspective view of a dissection of the hole in the middle.

FIG. 21A is an exploded plan view of a layer with copper laminate films.

FIG. 21B is an exploded bottom view of the layer.

FIG. 21C is an exploded perspective view of a dissection of the same layer.

FIG. 21D is an exploded plan view of the layer coated with a hole for a pin.

FIG. 21E is an exploded bottom view of the same layer.

FIG. 21F is an exploded perspective view of a dissection of the hole in the middle.

FIG. 21G is an exploded plan view of the layer with the hole coated with copper laminate.

FIG. 21H is an exploded bottom view of the same layer.

FIG. 21I is an exploded perspective view of a dissection of the hole in the middle.

FIG. 21J is an exploded plan view of the layer coated with gold.

FIG. 21K is an exploded bottom view of the same layer.

FIG. 21L is an exploded perspective view of a dissection of the hole in the middle.

DESCRIPTION OF EMBODIMENTS

In the following description, for the purposes of explanation, numerous specific details are set forth in order to provide a thorough understanding of various embodiments. It will be apparent, however, to one skilled in the art that embodiments of the present invention may be practiced without some of these specific details. In other instances, well-known structures and devices are shown in block diagram form.

For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. More than one methods may be shown in one flowchart. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides a socket that are electrically connected to electrical components such as semiconductor devices.

The present invention provides various embodiments as described below. However, it should be noted that the present invention is not limited to the embodiments described herein, but could extend to other embodiments as would be known or as would become known to those skilled in the art.

Embodiment 1

Figure 1:
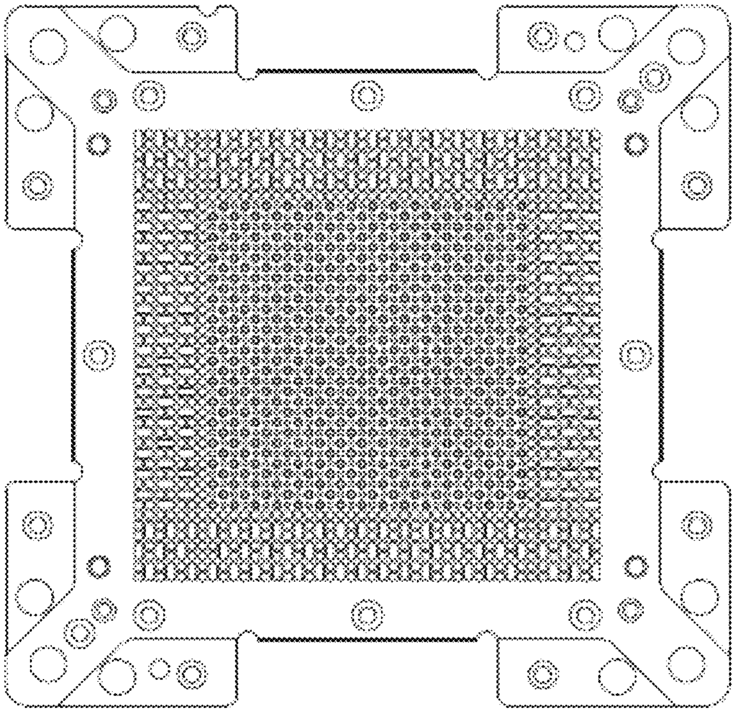

FIG. 1 shows a housing of pins for semiconductor testing implemented within Embodiment 1 of the present invention. As seen in FIG. 1, a housing has a shape that properly accommodates a tested device.

A centrally located rectangular grid is a lattice formed by a plurality of circular holes for pins.

Figure 2:
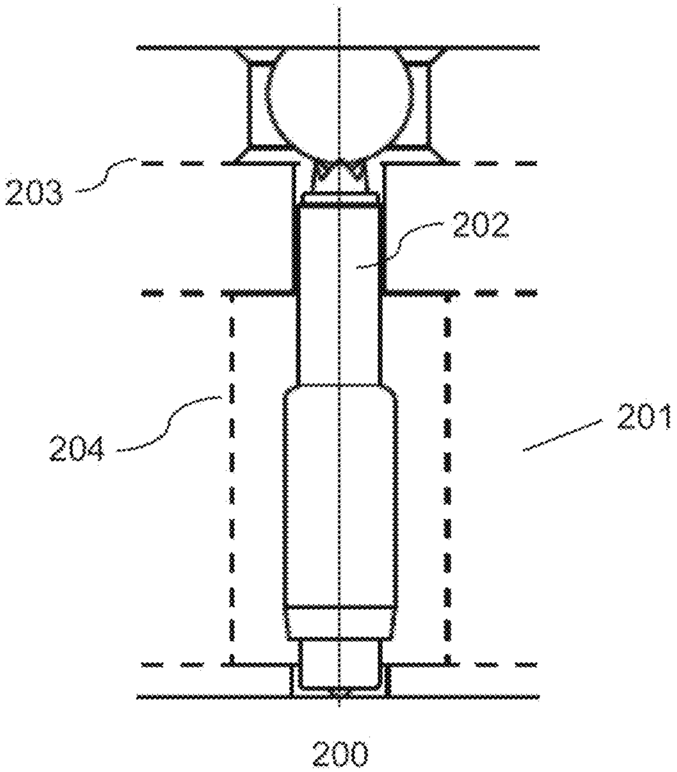
Figure 3A:
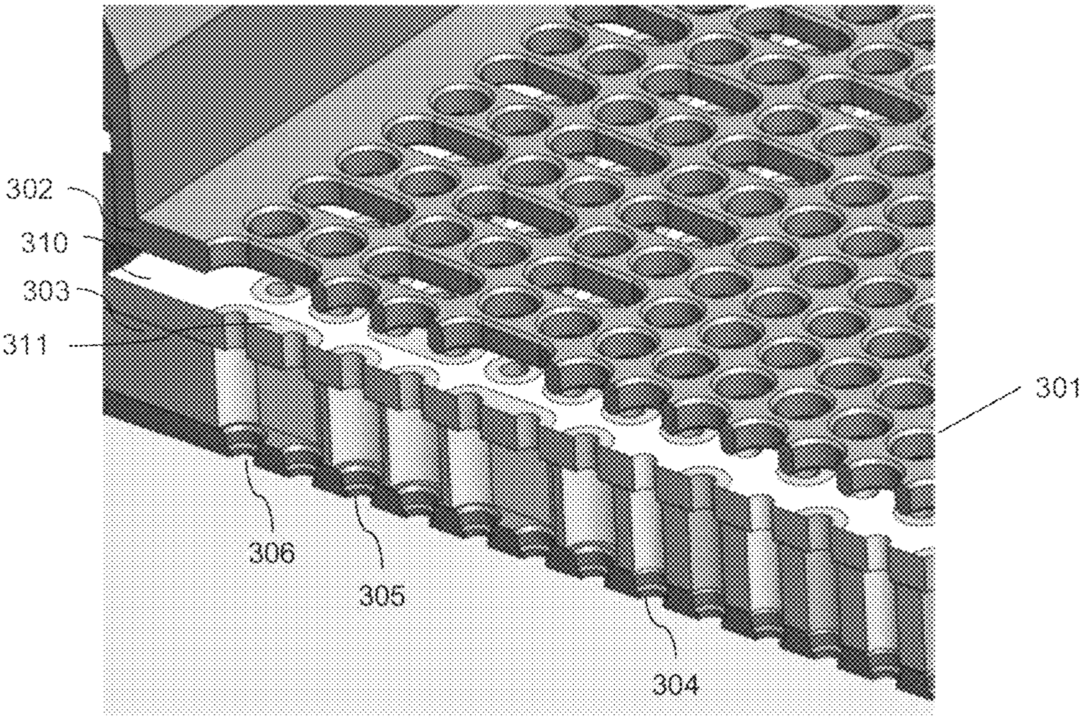
FIG. 3A is a partial enlarged view of one example of a shielded housing, with its highest layer moved apart from lower layers. Conductive material coating is shown.
Figure 3B:
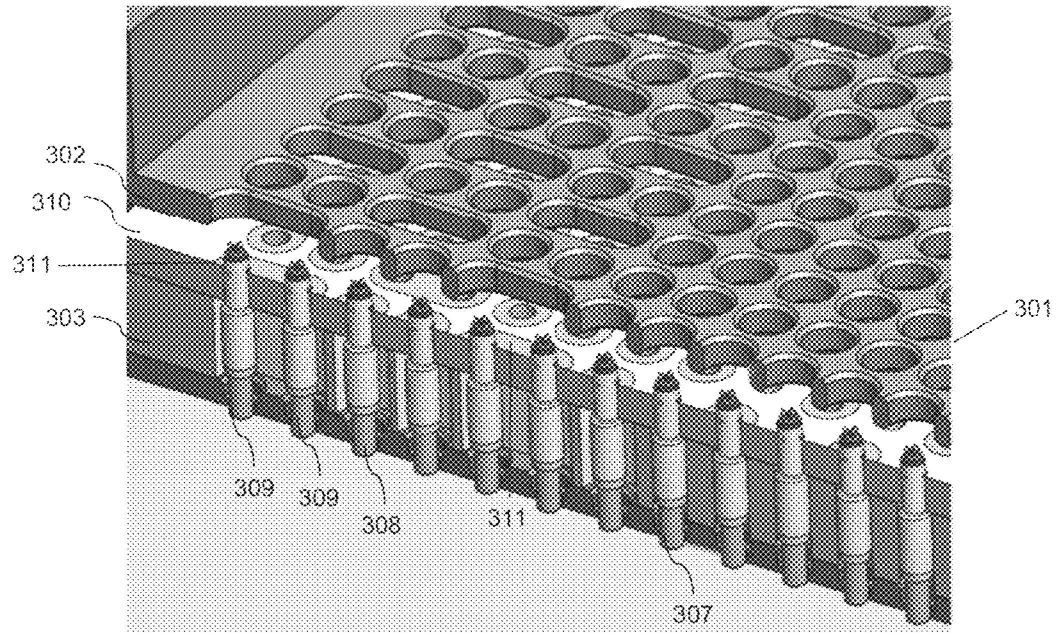
FIG. 3B is a partial enlarged view of one example of a shielded housing with pins.

As seen in FIGS. 2 and 3B, the grid may be formed by holes for signal pins and holes for ground pins. Also, there may be holes for power and other kinds of pins.

The signal pins may be lined in one or more neighboring rows. The signal pins may adapt different forms, and include single-ended signal pins and differential signal pins. The precise arrangement of various types of pins is not limited to a particular configuration, a form, an alignment, or a rule. One ordinary skill in the art may employ whatever workable methods for placing pins.

FIG. 1 is a top plan view of one layer located in a middle portion of the housing. Because FIG. 1 is a top plan view, openings seen in FIG. 1 correspond to holes in one layer but not necessarily to those in other layers. Layers may have holes and openings in differed shapes and in different locations. The openings in a layer may include gaps between pairs of signal pins.

FIG. 2 is a partial vertical cross-sectional view of the system having the housing 201 and the pin 202. One exemplary distribution of conductive materials in the multilayer housing is shown as dotted lines as seen in parts 203 and 204.

The distribution pattern described in FIG. 2 is meant to serve as a schematic illustration, and not scaled to actual measurements.

In accordance with one embodiment of the present disclosure, the housing 201 is made from a dielectric material, and the housing 201 may be divided into more than one layers.

In one embodiment, the housing 201 may be manufactured using widely available engineered plastic, while the majority of currently used housings are commonly coated with copper clad laminate.

In another embodiment, the housing 201 may be made of glass-reinforced epoxy without copper clad laminate.

The foundation of the housing 201 is made of customizable raw materials that are amply available on the market, and therefore, it is possible to create tightly set conditions with higher accuracy. Also, reasonably priced materials of the present disclosure may provide a key cost reduction in the device manufacturing, compared with housings made of materials such as copper clad laminate.

According to one or more embodiments, the conductive material coating may be applied on surfaces 203 of a plurality of layers and interior walls 204 of holes. The portion of the conductive material coating applied to the inner wall 204 of the hole that holds the signal pins correspond to the shield part of the present invention. The shield part is grounded and provided on an inner wall of the signal pin holder to surround the signal pin.

The housing manufactured according to one or more embodiments of the present disclosure is found to be superior to or equivalent to existing copper clad laminated housings in terms of the signal integrity. By substituting metal housings with housings that are made from dielectric materials and coated with conductive materials, not only properties such as signal integrity have been enhanced, but also the device safety has been augmented.

The above favorable characteristics are realizable in a diverse range of pins and housings. The present disclosure may be advantageously implemented in various types of testing devices for high-pitch signal transmission.

In accordance with several embodiments, the high-speed signal transmission is controlled well when the housing is coated with gold. For example, nickel coating may be first applied to the dielectric housing, and gold coating may be added next. The conductive material may be applied by any available method to planes of some of the plurality of layers and interior walls of holes for pins.

The conductive material coating of the present disclosure offers effective shields against disruptions in testing signal transmissions, such as crosstalk of neighboring pins.

In one embodiment, the size of a hole around a pin may be decided in accordance with the desired characteristic impedance of the system, which can be calculated by the equation below. The characteristic impedance may be decided by the diameter of an outer conductive material (e.g., hole diameter), the diameter of an inner conductive material (e.g., signal pin width), and the relative permittivity of a material between conductors.

$$Z_0=138/\sqrt{k}\ \log(d_1/d_2)$$

$Z_0$: Characteristic impedance of line $d_1$: Inside diameter of outer conductor $d_2$: Outside diameter of inner conductor k: Relative permittivity of insulation between conductors The size of a pin hole is also decided in consideration of other important factors, including the stabilization of the pin. According to several embodiments of the present disclosure, the housing 301 may be made of a plurality of layers. As shown in FIG. 3A, representative implementations of a socket (300) of the present disclosure may include a first hole (305, 306) for a signal pin (308, 309), a second hole (304) for a ground pin (307), and a third hole for a power pin.

In FIG. 3A, one exemplary pin housing 301 is shown. FIG. 3 does not depict a tested device that is mounted over the housing. Also, the highest layer 302 of the housing is lifted up from other layers 303, to better illustrate structures below the highest layer 302. At the time of testing, layers of the housing may be, brought into contact with each other like the aligned layers shown in FIG. 7B.

As shown in FIGS. 3A and 3B, holes may be aligned linearly, with signal pins (308, 309) positioned in peripheral areas of the housing 301. One wider hole may accommodate two signal pins (309) in the highest layer 302, and each signal pin may be accommodated by two separate holes in other layers 303. However, the configuration of the housing 301 is not limited to the illustration in FIGS. 3A and 3B and may take any other suitable forms.

As shown in FIG. 3B, in one preferred embodiment, the disclosed co-axial pin housing 301 may have conductive material coating on top planes 310 in a first group of layers and on inner walls of pin holes (304, 305, 306) in a second group of layers. In such embodiment, rims around the holes 311 at terminals of signal pins (308, 309) are not covered with conductive material. In uncoated areas, the base material of the housing is exposed.

One example of the housing 301 is illustrated in FIG. 3A. In one preferred embodiment, the highest layer 302 is saved from conductive material coating, but other lower layer 303 has conductive material on the top plane 310.

In yet another embodiment, the highest layer 302 is not coated with a conductive material while the lower layers are coated with a conductive material on their top planes 310.

According to some preferred embodiments of the present disclosure, the conductive material coating is spared in the vicinity of two terminals of signal pins (308, 309). As one illustrative implementation, FIG. 3B shows that interior walls of holes for signal pins (308, 309) are covered with a conductive material in the lower layer but spared in locations close to either the top or the bottom of the signal pins (308, 309).

In one or more embodiments, the conductive material coating may be additionally spared in the proximity of two ends of power pins.

In some embodiments, the conductive material includes gold. In preferred embodiments, gold is disposed after nickel plating is applied to the housing.

Figure 4A:
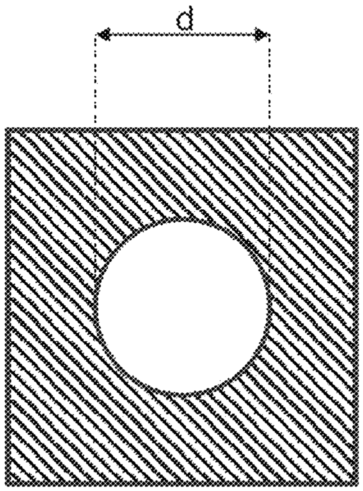
FIG. 4A is an exploded plan view of a hole in a layer in a middle portion of the housing.

FIG. 4A is an exploded plan view of a hole for a signal pin, made in the housing in accordance with one or more embodiments. While the hole has a circular shape in FIG. 4A, the hole may adopt other shapes such as oval and each layer may have differently shaped holes.

Figure 4B:
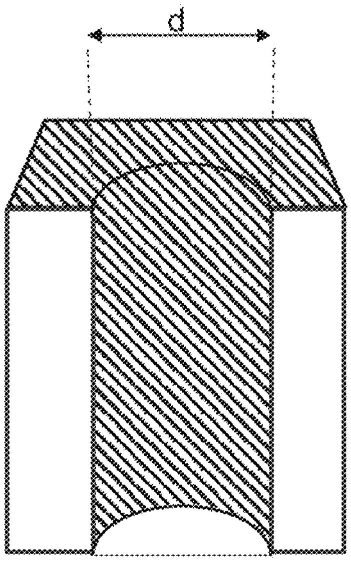
FIG. 4B is an exploded perspective view of a dissected hole in the same layer.

An exemplary layer in FIGS. 4A and 4B may be located in the middle or a lower half section of the housing.

In FIGS. 4A and 4B, the striped areas correspond to coated areas and the non-striped areas correspond to uncoated areas. In one embodiment of the present disclosure, the housing is not made of a conductive material (non-striped), and the top plane of the shown layer may be coated with a conductive material (striped).

In one or more embodiments, the conductive material coating for a particular layer may be determined by whether it is positioned near two ends of a signal pin. If the layer is approximately at the level of one of the signal pin's two terminals, the conductive material coating is spared to prevent unwanted disturbance of the signal integrity from the coating and prevent a short circuit.

FIG. 4B is an exploded perspective view of a dissection of the hole. The hole's inner wall is coated with a conductive material. The conductive material coating of inner surfaces of pin holes may be determined depending on several factors, including whether there is a risk of short between the coating and pins.

Although the hole in FIG. 4B is shown to be cylindrically shaped, the hole may take an irregular shape, having a non-linear, curved, or stepped inner surface.

Figure 4C:
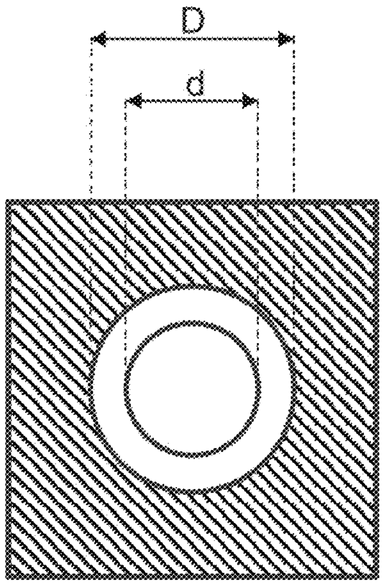
FIG. 4C is an exploded plan view of a hole in a layer in a middle to upper portion of the housing.

FIG. 4C is an exploded plan view of a hole for a signal pin, made in the housing in accordance with one or more embodiments. An exemplary layer in FIG. 4C may be located in an upper half to the middle of the housing.

Figure 4D:
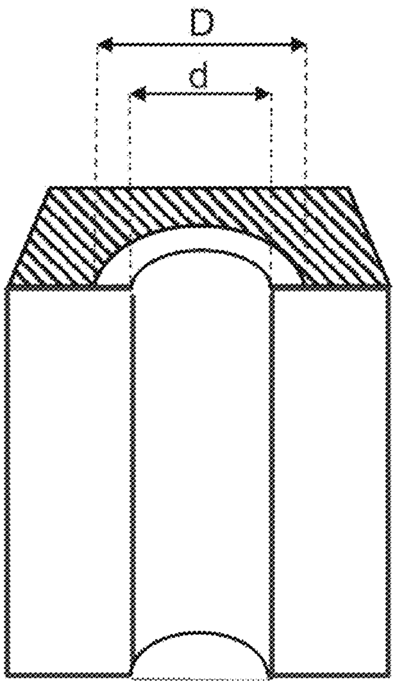
FIG. 4D is an exploded perspective view of a dissected hole in the same layer.

In FIGS. 4C and 4D, the striped areas correspond to coated areas and the non-striped areas correspond to uncoated areas.

The top plane of the shown layer has an area coated with a conductive material and an uncoated area, when the uncoated area is located in the vicinity of two terminals of signal pins.

The width of the non-plated area (D) in relation to the diameter of the hole (d) may not be fixed. In some embodiments, the non-plated area may be adjusted to optimize the signal integrity parameters, such as the pitch of signal pins, the housing base material, the conductive material, as well as the risk of a short in the electric circuitry. The hole's width or diameter (d) may change from layer to layer.

FIG. 4D is an exploded perspective view of a dissection of the hole for a signal pin. The hole's inner wall is not coated with a conductive material.

Figure 5A:
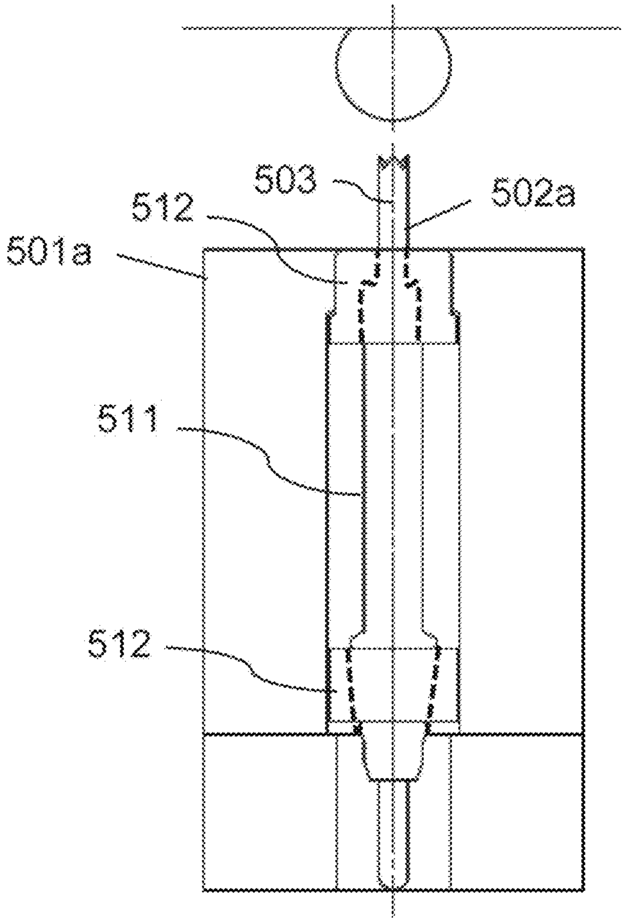
FIG. 5A is a partial vertical cross-sectional view of the housing with pins, schematically illustrating prior art.

In traditional housings 501*a*, a plunger 503 and a spring are housed in a barrel 511 as shown in FIG. 5A. The barrel 511 provides ground and removes accumulating resistance in the pin's spring. Also, sleeve-like structures 512 made of dielectric materials wrap the plunger 503 of pins 502*a*. The structure 512 is a safety mechanism against a short of the electric circuitry.

In some embodiments of the present disclosure as shown in 5B, a pin 502*b* may be made without a barrel. By placing one or more plungers 503 and a spring 504 without any surrounding barrel, such embodiment will save space and costs for placing a barrel and will further improve the performance of testing for high pitch integrated circuits. Likewise, absent a sleeve-like structure in the housing 501*b*, space and costs in making such parts are saved.

Figure 5B:
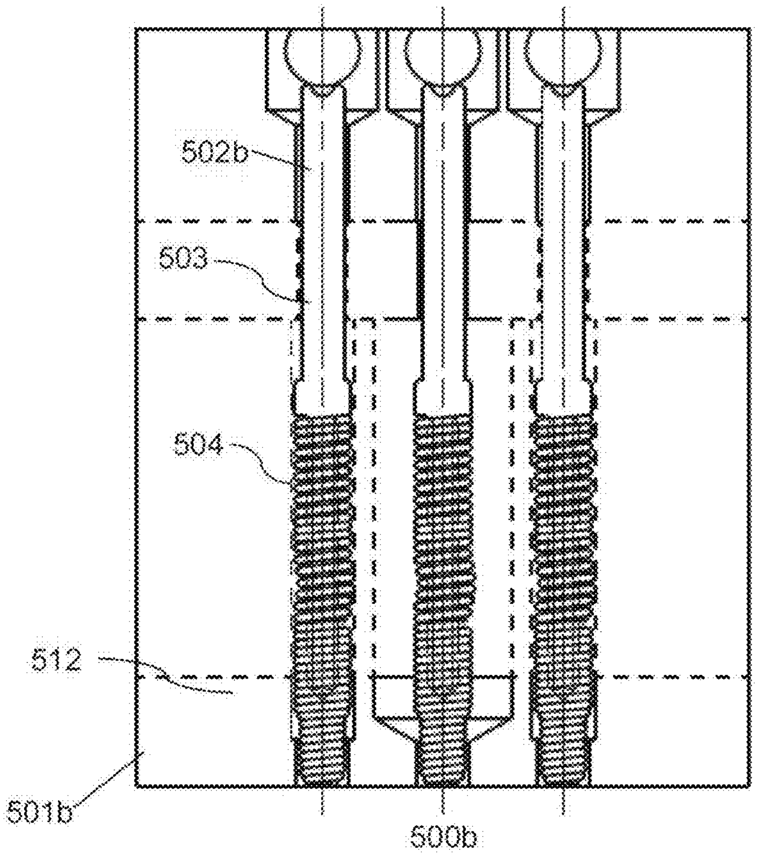
FIG. 5B is a partial vertical cross-sectional view of the housing with pins, schematically illustrating one embodiment.

As one or more embodiments, the present disclosure provides a comparable safety mechanism even without the sleeve-like structure in the housing 501*b* because there is no conductive material in the proximity of two ends of pins 502*b*. Additionally, barrel-less pins 502*b* may still provide a shielded housing 501*b* suitable for high-frequency signal transmissions when the conductive material coating is placed to provide a pathway for electricity grounding. In FIG. 5B, dotted lines indicate conductive material coating. Not that, the spring 504 contacts the coating at two locations including an upper end portion and an lower end portion.

As shown in FIG. 5B, in some embodiments, springs 504 of pins 502*b* are exposed, and the size of each pin 502*b* is reduced by the size of barrel. This amounts to a huge space and cost savings and functional improvement because of the large number of pins 502*b* in the housing 501*b*.

The improved signal integrity of a shielded testing system (socket) 500*b*, as described in the foregoing embodiments, may be observable by reduced return loss, TDR impedance, or insertion loss.

Figure 9:
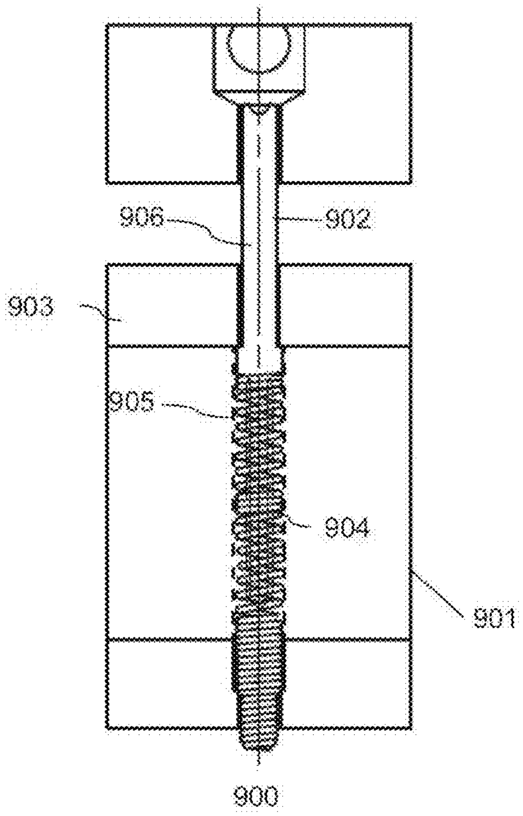
FIG. 9 is a partial vertical cross-sectional view of the housing with pins, schematically illustrating one embodiment.

FIG. 9 illustrates a partial vertical cross-sectional view of the system (socket) 900 having the pins 902 and the housing 901, in accordance with embodiments of the present disclosure. The dotted lines (e.g., inner linings of holes 905) show the distribution of a conductive material in one or more embodiments.

At another aspect of the present disclosure, a barrel-less pin 902 may be placed to create a direct electrical path between its spring 904 and conductive interior walls of holes 905 in the housing 901 as shown in FIG. 9. The creation of the path prevents the spring-related issue and the decrease in signal quality. A barrel-less pin 902A includes a top plunger 906 provided at an upward side and a coil spring 904 that is provided below the top plunger 906 and biases the top plunger 906. As shown in FIG. 9, spring 904 of the pins 902 may be electronically in contact with the interior walls of the holes 905. When the spring 904 is electronically connected with the conductive-material coating, the electrical properties of the spring 904 will become much less problematic since the electricity is transmitted through the interior wall of the hole 905, not through the spring 904.

Note that, in FIG. 9, The barrel-less pin 902A may be a signal pin or a ground pin. When the barrel-less pin 902A is a signal pin, the conductive-material coating provided to the holes is not grounded. On the other hand, when the barrel-less pin 902A is a ground pin, the conductive-material coating provided to the holes is grounded. Then, the spring 904 contacts the conductive-material coating part at two locations including an upper end portion and a lower end portion.

Figure 6A:
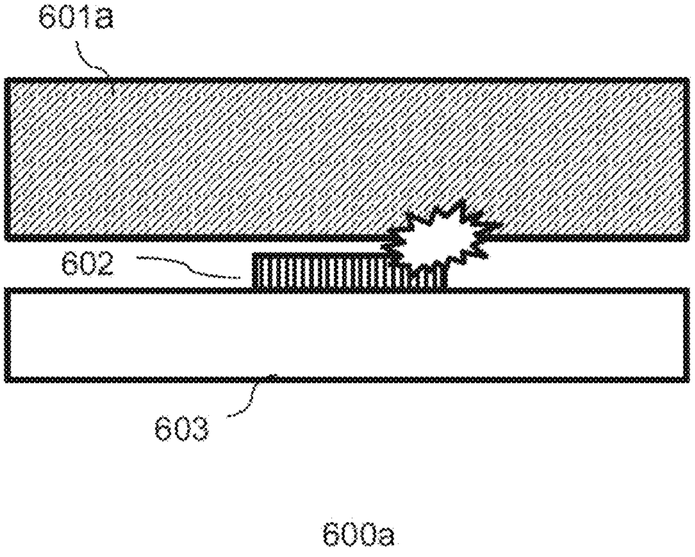
FIG. 6A is a partial vertical cross-sectional view of the housing with PCB, schematically illustrating prior art.
Figure 6B:
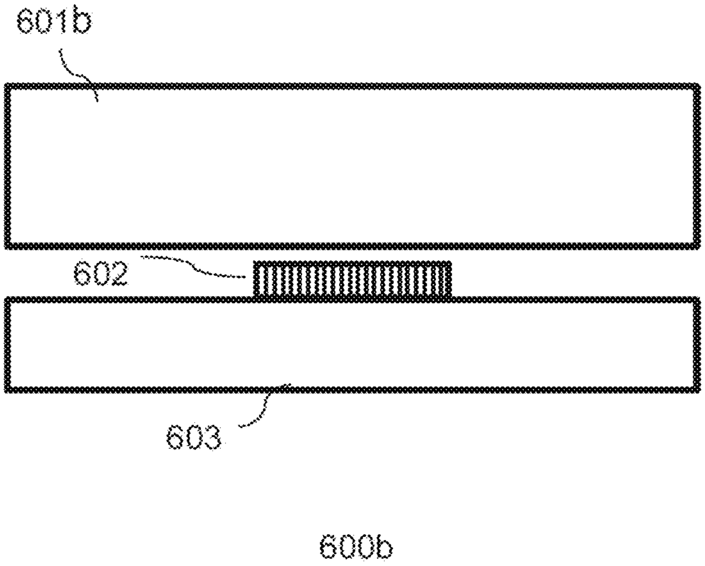
FIG. 6B is a partial vertical cross-sectional view of the housing with PCB, schematically illustrating one embodiment.

FIG. 6A is an enlarged view of a lower section of a system 600*a* in prior art, having a housing 601*a*. FIG. 6B is a partial enlarged view of one embodiment of the present disclosure, a system 600*b* having a housing 601*b*. A microstrip 602 of an integrated circuit 603 is shown.

In prior art systems 600*a*, the housing 601*a* is made of conductive material, which elicits nonnegligible electromagnetic disruptions to the microstrip 602, and affects the system's characteristic impedance. Additionally, because the integrated circuit 603 is made of dielectric materials, the wide permittivity difference in the neighboring materials aggravates the electromagnetic disturbance. There is an inherent risk of a short circuit in the systems 600*a*.

In one or more embodiments, the lower layer of the housing 601*b* is dielectric and has no conductive material, as shown in FIG. 6B. In such case, the housing 601*b* and the integrated circuit 603 possess similar characteristics, and the distortion in the impedance is relieved.

In many circumstances where a transmission line is built through a microstrip 602, the dielectric housing 601*b* prevents the abovementioned disruptions. The signal integrity may be better controlled in accordance with one or more embodiments of the instant disclosure.

Figure 7A:
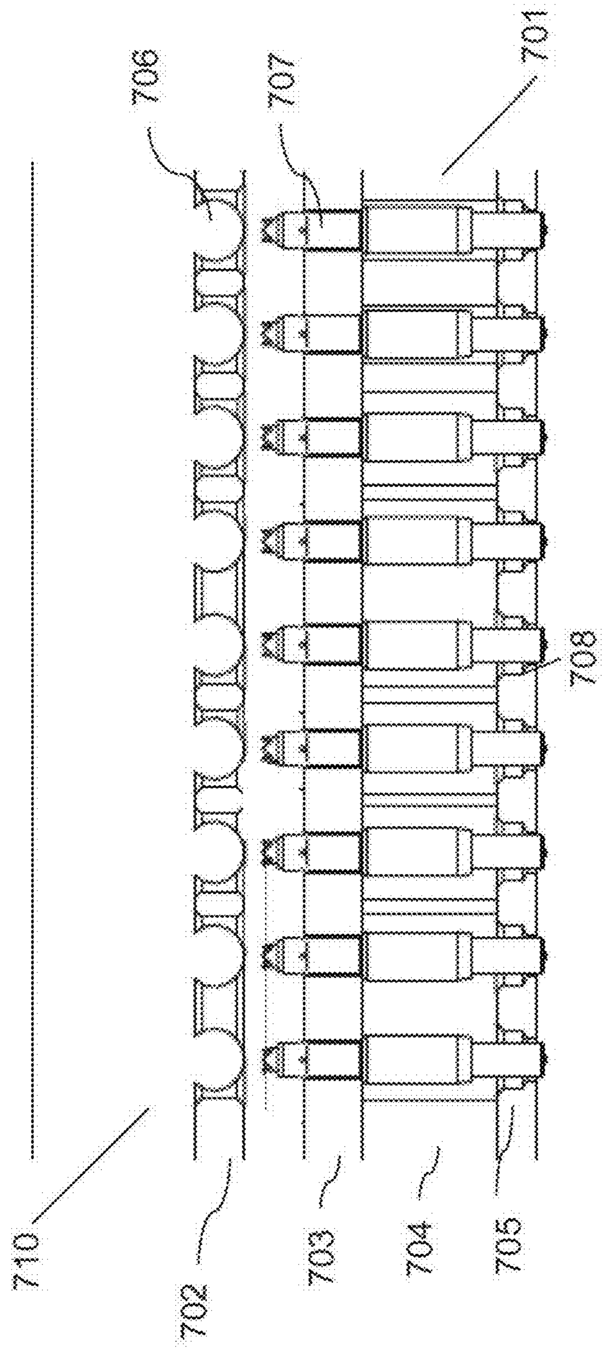
FIG. 7A is a partial vertical cross-sectional view of the housing with pins, schematically illustrating one embodiment.
Figure 7B:
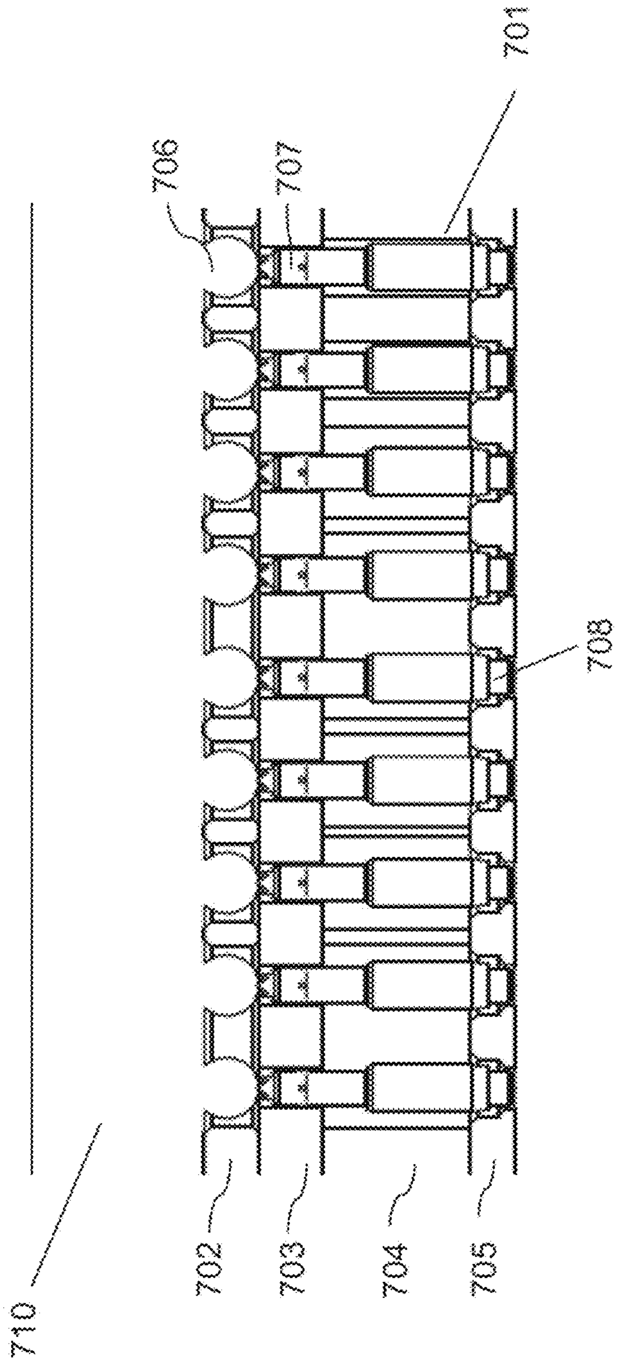
FIG. 7B is a partial vertical cross-sectional view of the housing with pins, with layers of the housing attached together.

FIGS. 7A and 7B are partial vertical cross-sectional views of the pin 708 and the housing 701, schematically illustrating one embodiment. As shown in FIGS. 7A and 7B, the housing may have four layers (702, 703, 704, 705). The highest layer 702 of the housing may be positioned at the level of the solder balls 706. The second highest layer 703 of the housing may be found from the top of the pin and downward. A portion of a plunger 707 may be wrapped by the second highest layer. The third highest lawyer 704 may be formed around the center and a lower portion of a plunger 707. The lowest layer 705 may be laid around the bottom of a pin.

In accordance with one implementation of the instant disclosure, the highest layer 702 may be placed to cover pin tips and protect pins from accidental damaging contact with external objects including a tested device 710. The top layer 702 may also serve as a guide for attaching the solder balls 706 to tops of pins 708.

The highest layer may also create a broader contact area between the tested device 710 and the housing 701, stabilize the contact between them. Another advantage for including the top layer 702 may include the correct attachment of the solder balls 706 to the pin tops.

In another embodiment, the housing may be made of fewer or more layers. For example, layers (703, 704) may be made as a single layer.

In one preferred embodiment, all layers of the housing are made of glass-reinforced epoxy. In such embodiment, the housing may be able to provide protection for a tested device from damages related to physical impacts and damages caused by scraping or abrasive surfaces, compared with housings made of metal. In another embodiment, the housing may be made of engineering plastic.

As one embodiment, some layers of the housing may be made by Electrostatic Dissipative (ESD) epoxy, which help reduce accumulation of electric charges. In such embodiment, unwanted charges may be obviated from accumulating in the housing.

Figure 8:
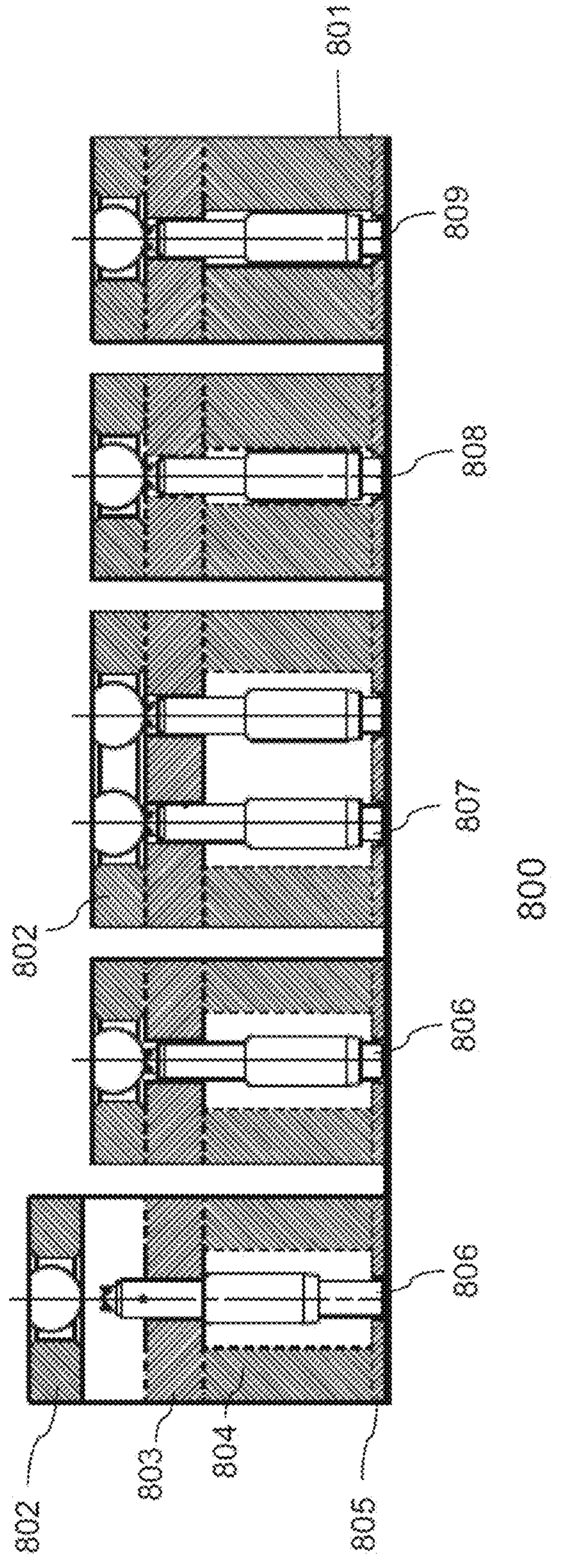

In FIG. 8, a pair of single-ended signal pins 806, a pair of differential pins 807, a ground pin 808, and a power pin 809 are shown as one exemplary implementation.

The dotted lines indicate the conductive material(s) coating.

As one embodiment, as shown in FIG. 8, the top layer 802 may be removed between adjacent differential signal pins 807. The removal of the top layer 802 will reduce electric disturbance related to the lower characteristic impedance environment.

Optionally, the third highest layer 804 of the housing may be removed between adjacent differential signal pins 807 in isolation or in combination with the removal of the top layer 802. The removal of the top layer 802 and the third highest layer 804 between the adjacent differential signal pins 807 will minimize electric disturbance related to the lower characteristic impedance environment.

The ground pin 808 is electronically in contact with the conductive material coating to provide the shielded environment.

Embodiments of the present disclosure include methods of making a housing and a pin for semiconductor testing, including: creating a vertically patent hole in the housing; adding planar conductive coating to one or more layers of the housing; adding conductive coating to interior of the hole, storing a pin in the hole; and positioning all layers of the housing to align the hole to a corresponding receptor of a tested device, the one or more layers being made of a dielectric material, and the conductive material coating being spared in the immediate proximity of two ends of power pins and pins.

In one embodiment, the method comprises: creating a first hole for a signal pin and a second hole for a ground pin in the housing; adding conductive coating to top planes of a first group of layers and bottom planes of a second group of layers of the housing; adding conductive coating to interior of the first hole and the second hole in a third group of layers; storing the signal pin in the first hole and the ground pin in the second hole in the first group of layers; positioning all layers of the housing to attach the signal pin to a corresponding receptor of a tested device the all layers being made of a dielectric material, and the conductive coating being spared in the proximity of two ends of the signal pin to prevent a short circuit.

In one embodiment using barrel-less pins, the method may further include: adjusting the size of the first hole around a spring 504 of the signal pin in accordance with the desired characteristic impedance of the system and the width of the signal pin, the first hole containing air around the signal pin as illustrated in FIG. 5B.

As an exemplary implementation of the present disclosure, the method may also comprise: saving conductive materials in the area where presence of conductive materials pose a risk of electrical short circuit.

In one embodiment, gold is used for the planar conductive coating and the conductive coating of the interior of the hole.

In one embodiment, the method may also include: coating top planes of a first group of layers with a second conductive material; coating interiors of the first hole and the second hole in a second group of layers with a second conductive material.

In one embodiment, the method may include: in relation to a desired pin pitch, adjusting the uncoated area to realize optimization of signal integrity and minimization of a short circuit.

In one embodiment, the method may include: deciding a position and a size of the first hole and a type of the conductive material to minimize crosstalk between neighboring signal pins and between signal pins and the housing.

In one embodiment, the method may include: creating a direct electrical path between a spring of the signal pin 904 and the interiors of the first hole 905.

In one embodiment, the method may include: selecting a first group of layers based on a position of a top plane of each layer in the first group in relation to vertical positions of the ends of the signal pin.

In another embodiment, the method may include: positioning a top layer of the one or more layers around a solder ball to guide a tested device to the signal pin and maintain contact between the solder ball and the signal pin.

In yet another embodiment, the method may include: opening a space between springs of two adjacent differential pins in the one or more layers.

In a preferred embodiment, the method may include: maintaining an open space between two adjacent differential pins in the one or more layers without sacrificing stabilization of the two adjacent differential pins.

Embodiment 2

Figure 10:
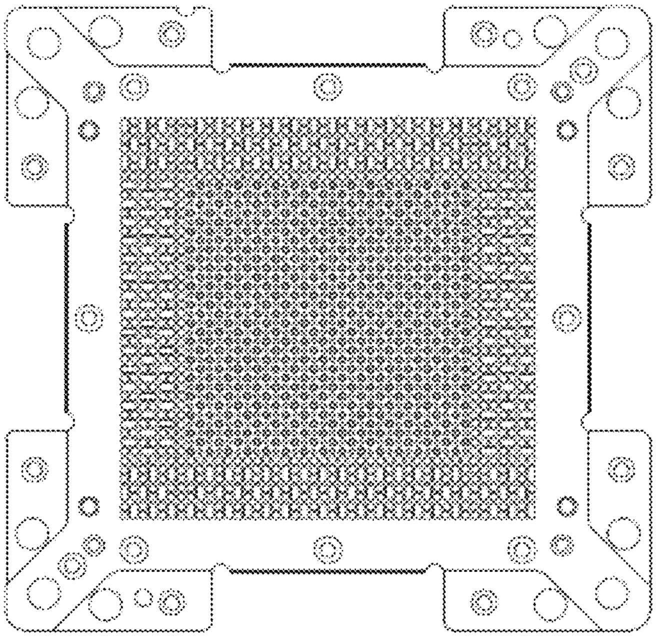

FIG. 10 shows a socket of pins for semiconductor testing implemented within Embodiment 2 of the present invention. As seen in FIG. 10, a socket has a shape that properly accommodates a tested device.

A centrally located rectangular grid is a lattice formed by a plurality of circular holes and oval holes for pins.

The grid may be formed by holes for signal pins and holes for ground pins. Also, there may be holes for power and other kinds of pins.

The signal pins may be lined in one or more neighboring rows. The signal pins may adapt different forms, and include single-ended signal pins and differential signal pins. The precise arrangement of various types of pins is not limited to a particular configuration, a form, an alignment, or a rule. One ordinary skill in the art may employ whatever workable methods for placing pins.

FIG. 10 is a top plan view of one layer of the socket. Because FIG. 10 is a top plan view, openings seen in FIG. 10 correspond to holes in one layer but not necessarily to those in other layers. Layers may have holes and openings in differed shapes and in different locations. However, if there is an opening for a pin at one location in a layer, there are openings for the pin at corresponding locations in other layers. The openings in a layer may include gaps between pairs of signal pins.

Figure 12:
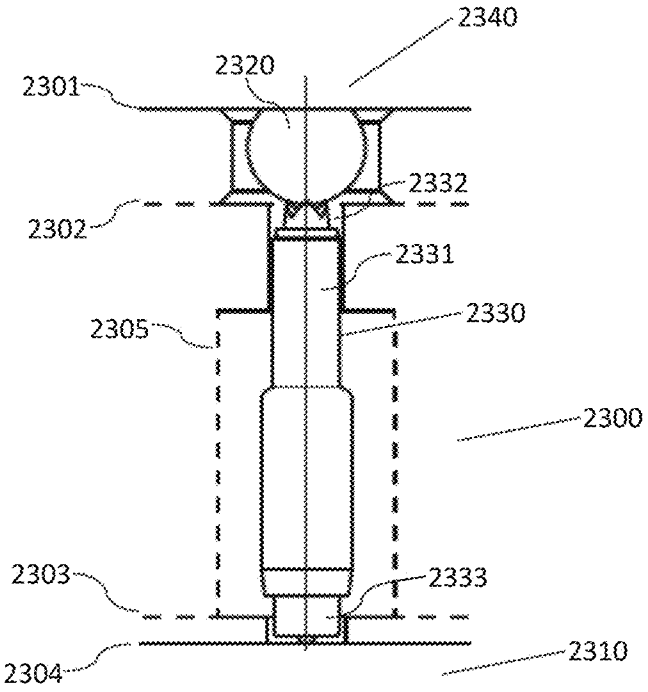

FIG. 12 is a partial vertical cross-sectional view of a socket of the present disclosure 2300, a tested device 2340, a PCB 2310, and a pin 2330. One exemplary distribution of conductive materials in the multi-layer housing is shown as dotted lines as seen in parts 2302, 2303, and 2305.

The distribution pattern described in FIG. 12 is meant to serve as a schematic illustration, and not scaled to actual measurements.

In accordance with one embodiment of the present disclosure, the socket 2300 is made from a dielectric material, and the socket 2300 may be divided into two or more layers.

In one embodiment, the socket 2300 may be manufactured using widely available engineered plastic, while the majority of currently used sockets are commonly coated with copper clad laminate.

In another embodiment, the socket 2300 may be made of glass-reinforced epoxy without copper clad laminate.

The foundation of the socket 2300 is made of customizable raw materials that are amply available on the market, and therefore, it is possible to satisfy tightly set conditions and create sockets with higher accuracy. Also, reasonably priced materials of the present disclosure may provide a key cost reduction in the device manufacturing, compared with sockets made of materials such as copper clad laminate.

According to one or more embodiments, the conductive material coating may be applied on surfaces (2302, 2303) of a plurality of layers and interior walls 2305 of holes.

The socket manufactured according to one or more embodiments of the present disclosure is found to be superior to or equivalent to existing copper clad laminated sockets in terms of the signal integrity. By substituting metal sockets with sockets that are made from dielectric materials and coated with conductive materials, not only properties such as signal integrity have been enhanced, but also the device safety has been augmented.

The above favorable characteristics are realizable in a diverse range of pins and sockets. The present disclosure may be advantageously implemented in various types of testing devices for high-pitch signal transmission.

In accordance with several embodiments, the high-speed signal transmission is controlled well when the socket is coated with gold. For example, nickel coating may be first applied to the dielectric socket, and gold coating may be added next. The conductive material may be applied by any available method to planes of some of the plurality of layers and interior walls of holes for pins.

The conductive material coating of the present disclosure offers effective shields against disruptions in testing signal transmissions, such as crosstalk of neighboring pins.

The improved signal integrity of a shielded testing system, as described in the foregoing embodiments, may be observable by reduced return loss, TDR impedance, or insertion loss.

Figure 11:
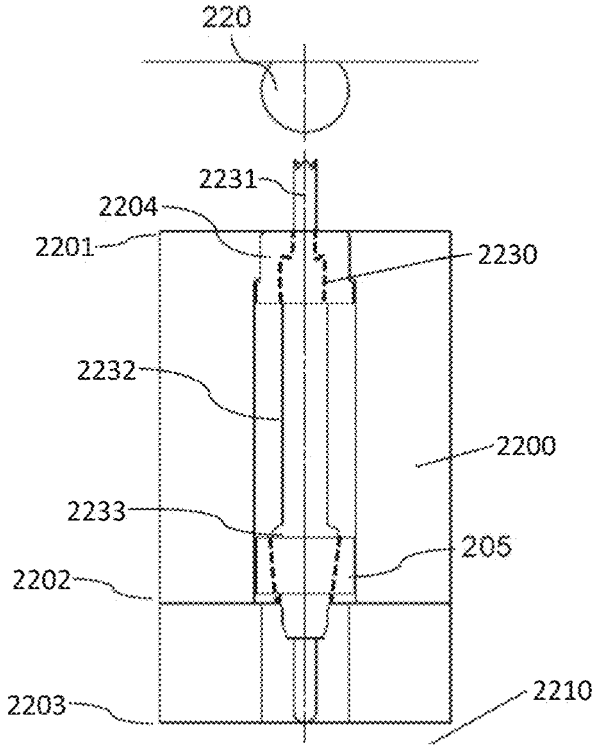

In traditional sockets 2200, a plunger 2231 and a spring are housed in a barrel 2232 as shown in FIG. 11. The barrel 2232 provides ground and removes accumulating resistance in the pin's spring. Also, sleeve-like structures 2204, 2205 made of dielectric materials wrap the plunger 2231 of a pin 2230. The structures 2204, 2205 are a safety mechanism against a short circuit.

In some embodiments of the present disclosure, a shielded pin socket 2300 with distributed conductive material coating possesses a comparable safety mechanism even without the sleeve-like structure. Conductive material is not applied in the proximity of two ends of a pin 2332, 2333. In FIG. 12, dotted lines indicate conductive material coating.

As shown in FIG. 12, in some embodiments, the socket 2300 may be three layered. The highest layer's top surface 2301 may be contact a tested device 2340, and the top surface of the second highest layer 2302 may lie at the same level with the pin's top 2332. The lower surface of the lowest layer 2304 may lie around the level of the pin's bottom 2333.

The size of the hole changes to hold the pin 2330 at its head 2332 and bottom 2333. For example, the hole is smaller at the pin's upper terminal 2332 and lower terminal 2333 than the pin's middle section 2331. The size of the hole in the middle section may be determined to realize the desired characteristics of the socket.

In one embodiment, the size of the hole may be decided in accordance with the desired characteristic impedance of the system, which can be calculated by the equation below. The characteristic impedance may be decided by the diameter of an outer conductive material (e.g., hole diameter), the diameter of an inner conductive material (e.g., signal pin width), and the relative permittivity of a material between conductors.

$$Z_0=138/\sqrt{k}\ \log(d_1/d_2)$$

Figure 16A:
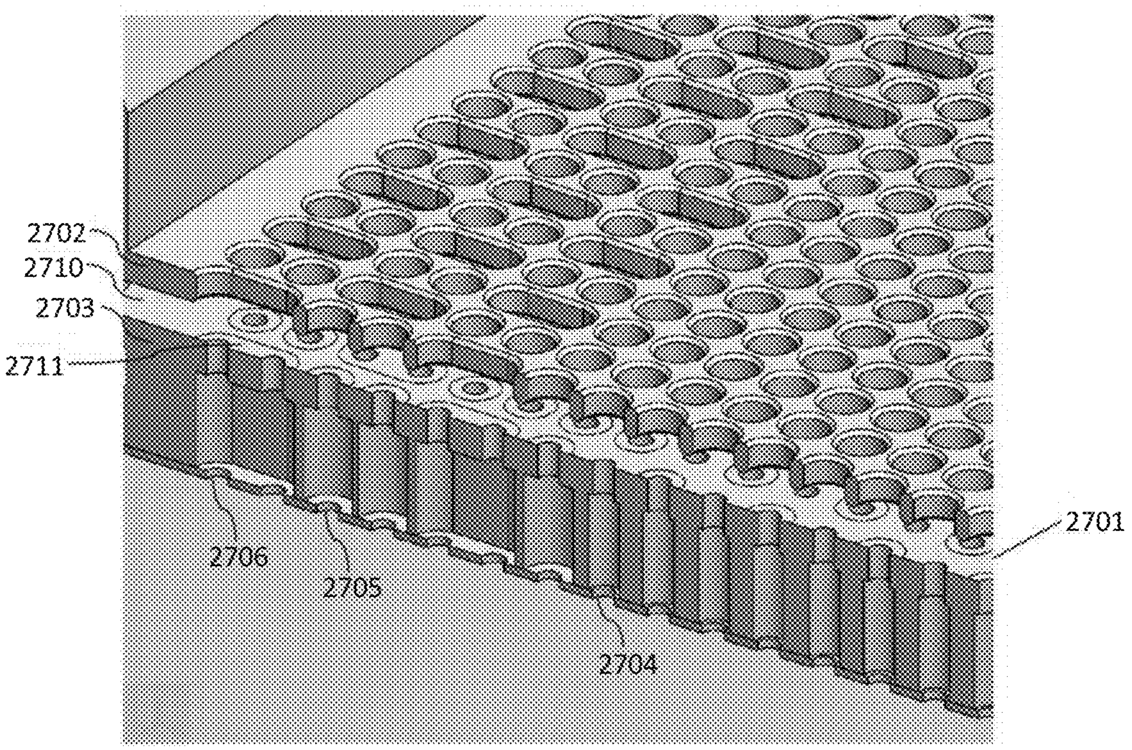
FIG. 16A is a partial enlarged view of one example of a shielded socket, with its highest layer moved apart from lower layers. Conductive material coating is shown.

$Z_0$: Characteristic impedance of line $d_1$: Inside diameter of outer conductor $d_2$: Outside diameter of inner conductor k: Relative permittivity of insulation between conductors According to several embodiments of the present disclosure, the socket 2701 may be made of a plurality of layers. As shown in FIG. 16A, representative implementations of the socket 2700 of the present disclosure may include a first hole (2705, 2706) for a signal pin (2308, 2309), a second hole (2704) for a ground pin (2707), and a third hole for a power pin.

Figure 16B:
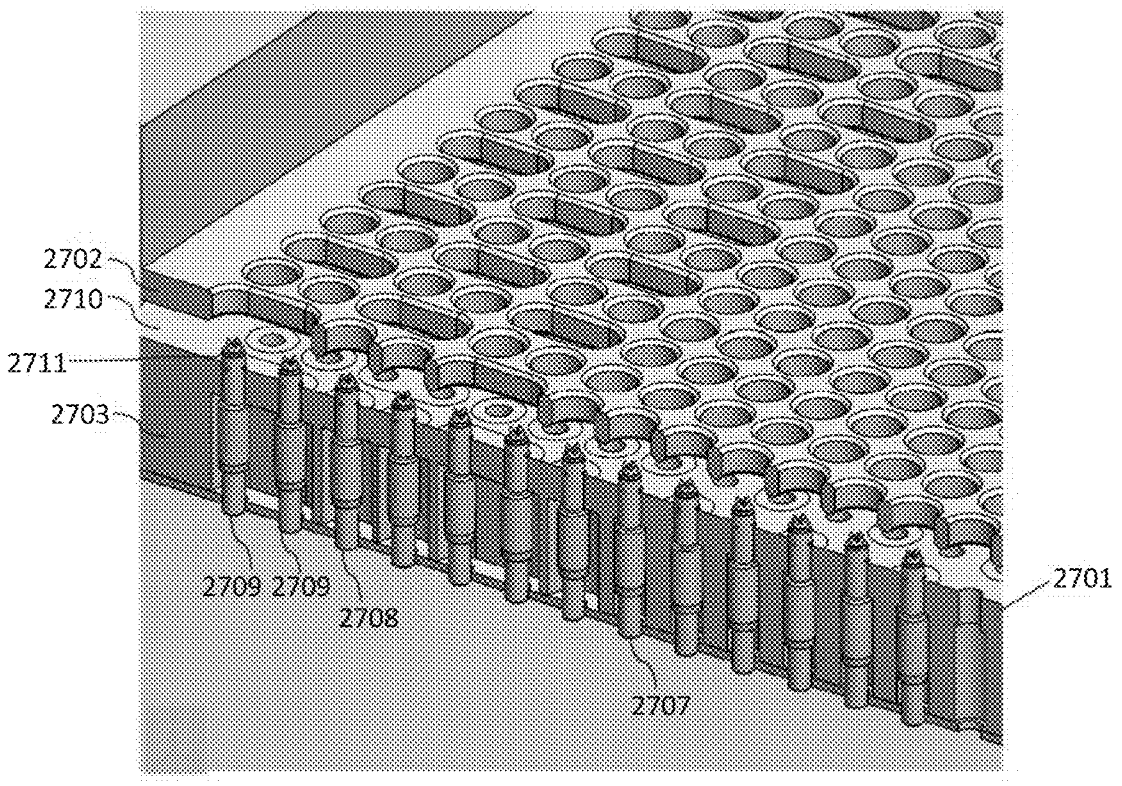
FIG. 16B is a partial enlarged view of one example of a shielded socket with pins, with its highest layer moved apart from lower layers.

In FIG. 16A, one exemplary pin socket 2701 is shown. FIGS. 16A and 16B do not depict a tested device that is mounted over the socket. Also, the highest layer 2702 of the socket is lifted up from other layers 2703, to better illustrate structures below the highest layer 2702. At the time of testing, layers of the socket may be, brought into contact with each other like the aligned layers shown in FIG. 12.

As shown in FIGS. 16A and 16B, holes may be aligned linearly, with signal pins (2708, 2709) positioned in peripheral areas of the socket 2701. One wider hole may accommodate two signal pins (2709) in the highest layer 2702, and each signal pin may be accommodated by two separate holes in other layers 2703. However, the configuration of the socket 2701 is not limited to the illustration in FIGS. 16A and 16B and may take any other suitable forms.

As shown in FIG. 16B, in one preferred embodiment, the disclosed co-axial pin socket 2701 may have conductive material coating on top planes 2710 of layers and on inner walls of pin holes (2704, 2705, 2706). In such embodiment, rims around the holes 2711 at terminals of signal pins (2708, 2709) are not covered with conductive material. In uncoated areas, the base material of the socket is exposed.

One example of the socket 2701 is illustrated in FIG. 16A. In one preferred embodiment, the highest layer 2702 is saved from conductive material coating, but a lower layer 2703 has conductive material on the top plane 2710.

In yet another embodiment, the highest layer 2702 is not coated with a conductive material while the lower layers are coated with a conductive material on their top planes 2710.

According to some preferred embodiments of the present disclosure, the conductive material coating is spared in the vicinity of two terminals 2711 of signal pins (2708, 2709). As one illustrative implementation, FIG. 16B shows that interior walls of holes (2705, 2706) for signal pins (2708, 2709) are covered with a conductive material in the lower layer but spared in locations close to either the top or the bottom of the signal pins (2708, 2709).

In one or more embodiments, the conductive material coating may be additionally spared in the proximity of two ends of power pins.

In some embodiments, the conductive material includes gold. In preferred embodiments, gold is disposed after nickel plating is applied to the socket.

Figure 13A:
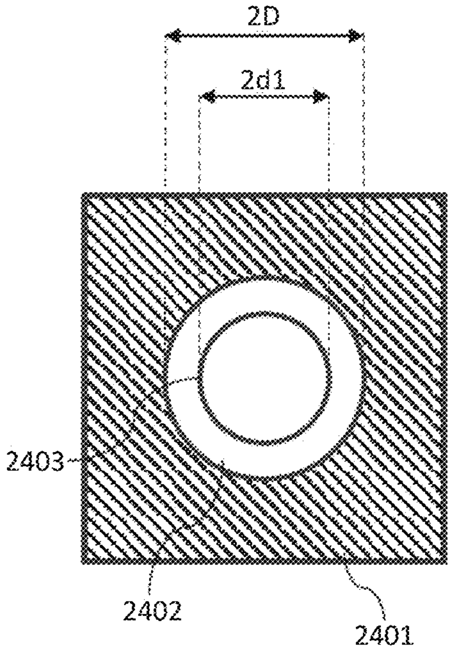
FIG. 13A is an exploded plan view of a hole in a layer of the socket, according to one embodiment.
Figure 13B:
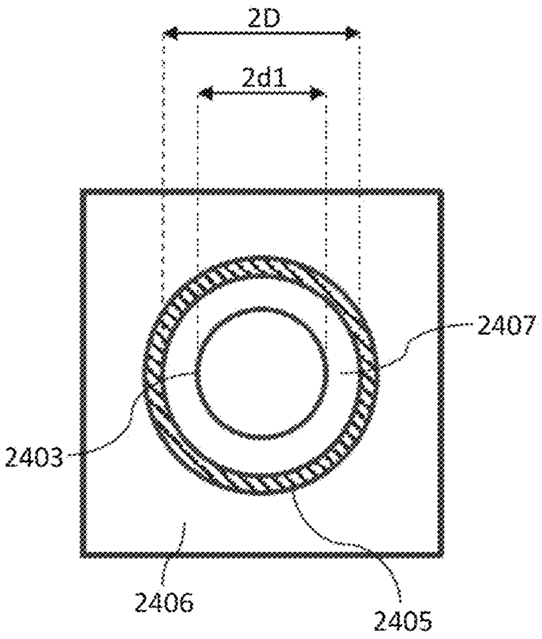
FIG. 13B is an exploded bottom view of the hole.

FIG. 13A is an exploded plan view of a hole for a signal pin, made in a layer of the socket in accordance with one or more embodiments. FIG. 13B is an exploded bottom view of the hole in the same layer. While the hole has a circular shape in FIGS. 13A and 13B, the hole may adopt other shapes such as oval and each layer may have differently shaped holes.

In FIGS. 13A to 13F, the striped areas correspond to coated areas and the non-striped areas correspond to uncoated areas. In one embodiment of the present disclosure, the socket is not made of a conductive material (non-striped), and the top plane of the shown layer may be partially or entirely coated with a conductive material (striped).

In one or more embodiments, the conductive material is applied to one area of a particular layer based on whether the area is positioned near two ends of a signal pin or two ends of a power pin. If the area is located close to these pins' two terminals, the conductive material coating is spared to prevent unwanted disturbance of the signal integrity from the coating and prevent a short circuit. As illustrated in FIG. 13A, 13B, 13D, 13E, the exemplary hole may be accompanied by an uncoated rim.

Figure 13C:
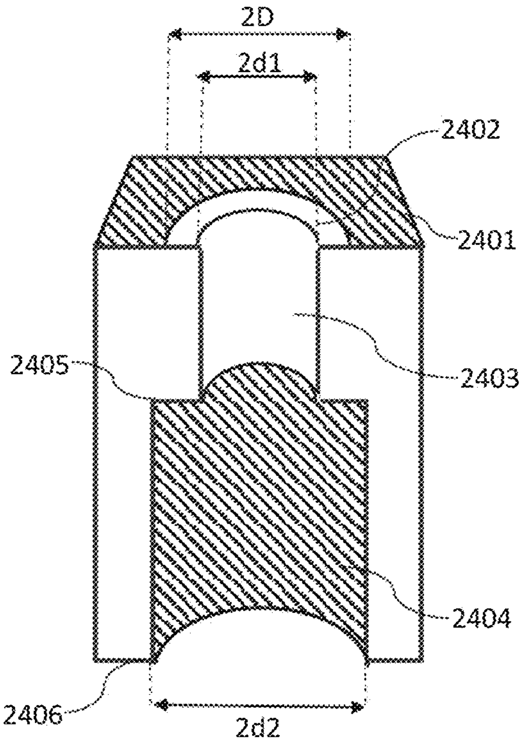
FIG. 13C is an exploded perspective view of a dissected hole in the same layer.

FIG. 13C is an exploded perspective view of a dissection of the hole in the same layer. A lower portion of the hole's inner wall 2404 is coated with a conductive material. The conductive material coating may be determined depending on several factors, including whether there is a risk of a short circuit.

Although the hole in FIG. 13C is shown to be cylindrically shaped, the hole may take an irregular shape, having a non-linear, curved, or stepped inner surface.

Figure 13D:
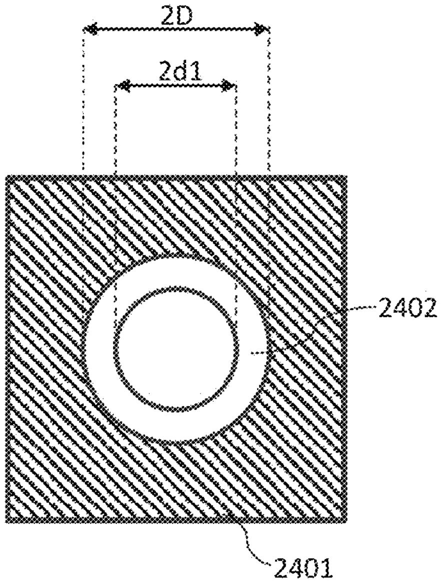
FIG. 13D is an exploded plan view of a hole in a layer in the socket, according to another embodiment.
Figure 13E:
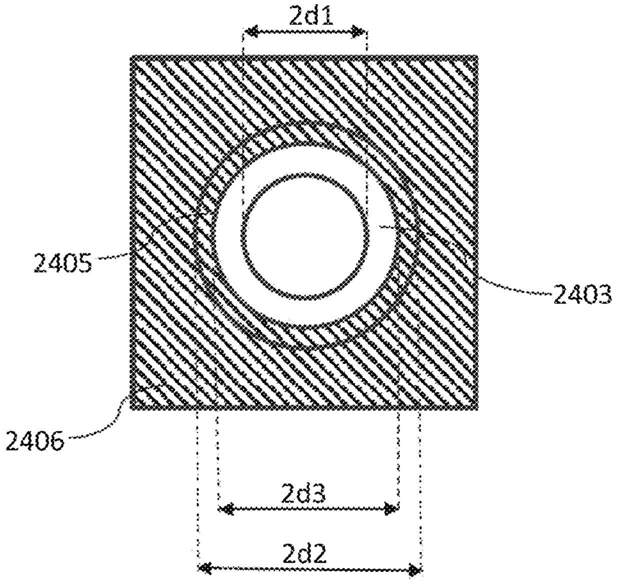
FIG. 13E is an exploded bottom view of the hole.
Figure 13F:
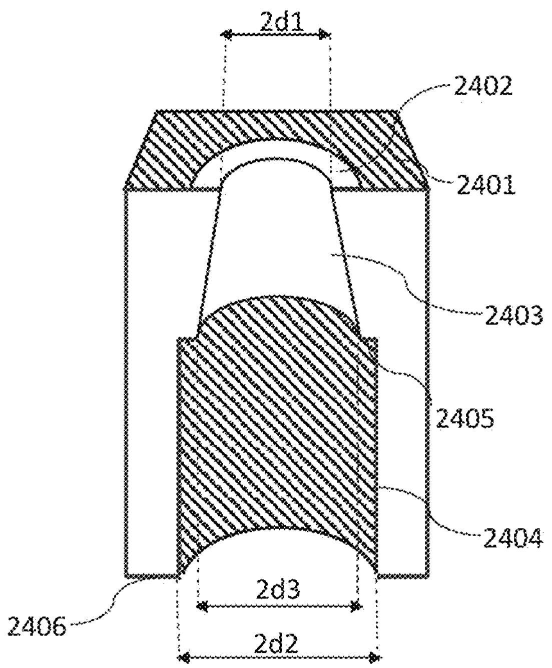
FIG. 13F is an exploded perspective view of a dissected hole in the same layer.

FIG. 13D is an exploded plan view of a hole for a signal pin in one layer, made in the housing in accordance with one or more embodiments. FIG. 13E is an exploded bottom view of the hole in the same layer. The areas of conductive material coating 2405, 2406 are observable from the bottom through the opening. The hole's diameter (2d3) at an edged floor 2405 is narrower than the diameter (2d2) at the bottom 2406.

The top plane of the shown layer has an area 2401 coated with a conductive material and an uncoated area 2402. The edged floor also has a coated area 2405, abutting an uncoated surface 2403. Areas located in the vicinity of two terminals of signal pins are generally uncoated 2402, 2403.

The width (2D) of the non-coated area 2402 in relation to the diameter of the hole (2d1) may not be fixed. In some embodiments, the non-coated area 2402 may be adjusted to optimize the signal integrity parameters, such as the pitch of signal pins, the socket base material, the conductive material, as well as the risk of a short in the electric circuitry. The hole's width or diameter (2d1, 2d2, 2d3) may change from layer to layer.

Figure 14A:
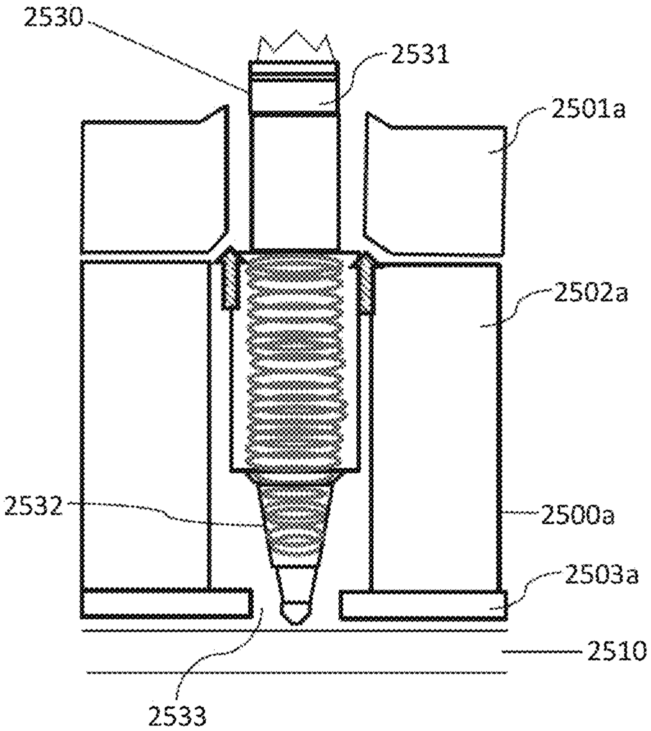
FIG. 14A is a partial vertical cross-sectional view of the housing with pins, schematically illustrating prior art.
Figure 14B:
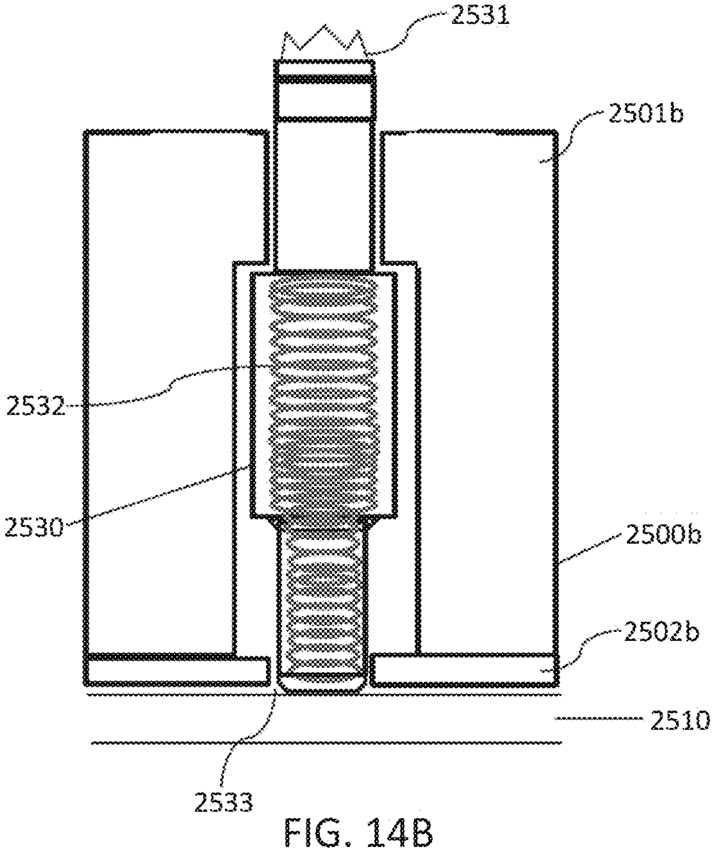
FIG. 14B is a partial vertical cross-sectional view of the housing with pins, schematically illustrating one embodiment.

FIG. 14A is a partial vertical cross-sectional view of a socket of prior art 2500*a*, a PCB 2510, and a pin 2530. FIG. 14B is a partial vertical cross-sectional view of one embodiment of the present disclosure, a socket 2500*b*, a PCB 2510, and a pin 2530.

A prior art socket 2500*a* is made of a conductive material, which elicits nonnegligible electromagnetic disruptions to the signal transmissions, and affects the system's characteristic impedance. In accordance with one embodiment of the present disclosure, the socket 2500*b* may be made of dielectric materials.

The socket 2500*a* bears a considerable amount of pressure, including preload force that is added to create a tight connection between the socket 2500*a* and a tested device. Because of the significant force (as indicated by upward pointing arrows), the socket 2500*a* tends to bow. The layer 2501*a* receiving such force can be partially lifted up from lower layers and swerve. These potentially cause damages to a device, the socket 2500*a*, or the pin 2530. The risk of an electrical short is of particular concern. Further, the structural changes cause disruptions to the system's mechanical and electrical integrity.

In contrast to a socket made of multiple layers (2501*a*, 2502*a*, 2503*a*) of prior art, the dielectric socket 2500*b* may be made of fewer layers (2510*b*, 2502*b*). In one example, as depicted in FIG. 14B, two layers of prior art (2501*a*, 2502*a*) may be converted into a single dielectric layer (2501*b*). In such embodiments, the preload force to the layer 2501*b* does not affect the layer's structure nor causes bowing of the socket 2500*b*.

In one preferred embodiment, the socket 2500*b* is made of glass-reinforced epoxy. In such embodiment, the elasticity may be able to prevent scratches or other damages to a device and mechanical impairments such as cracks related to preload force bearing, compared with sockets made of metal. In another embodiment, the socket may be made of engineering plastic.

As one embodiment, layers of the socket 2500*b* may be made by Electrostatic Dissipative (ESD) epoxy, which help reduce accumulation of electric charges. In such embodiment, unwanted charges may be obviated from accumulating in the socket.

Figure 15:
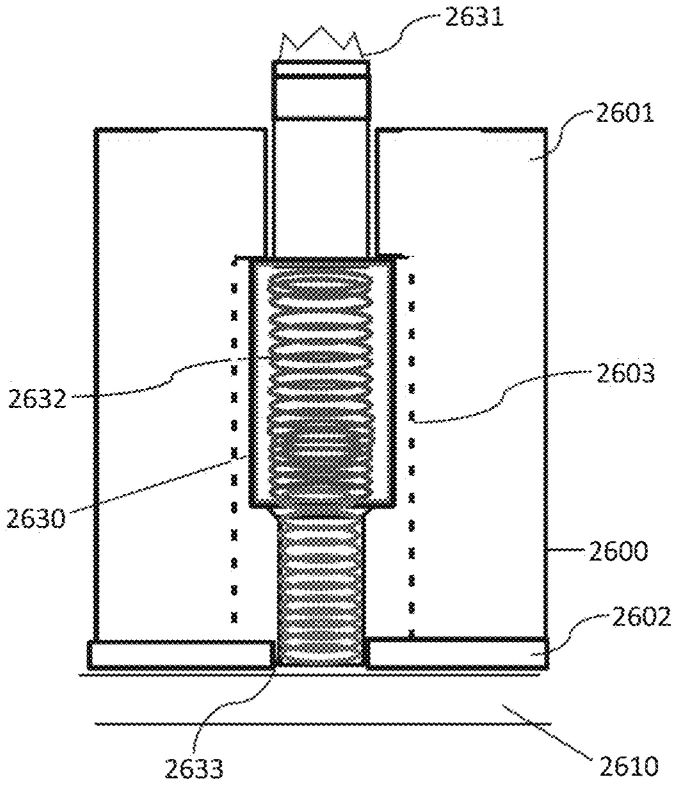

FIG. 15 is a partial vertical cross-sectional view of a socket as one embodiment 2600, a PCB 2610 and a pin 2630. The dotted lines show conductive material coating.

The socket 2600 may consist of dielectric layers (2601, 2602). Customizable raw materials may be used to make the socket 2600. When the lowest layer 2602 is made of Flexible Circuit Board (FPC), its thickness and dimensions are tightly controllable. By adopting a thinner layer 2602, preferably thinner than 0.2 mm, the total surface of conductive material coating, including coating of the hole's surface 2603, is substantially greater than in conventional sockets. As a result, the electrical pathway for signals is simplified, and the risk of short circuit is more firmly controllable, compared with sockets made of materials such as copper clad laminate.

The socket manufactured according to one or more embodiments of the present disclosure is found to be superior to existing copper clad laminated sockets in terms of the signal integrity. By substituting metal sockets with dielectric sockets with conductive material coating, the socket's layer dimension as well as conductive material coating is precisely controllable, and the system's signal integrity is enhanced.

The above favorable characteristics are realizable in a diverse range of pins and sockets. The present disclosure may be advantageously implemented in various types of testing devices for high-pitch signal transmission.

Embodiments of the present disclosure include methods of making a socket for testing a device, comprising: creating vertically patent holes for pins in the socket; coating two or more layers of the socket with a conductive material; and positioning the socket to attach the pins to corresponding receptors of the device, wherein the socket is made of a dielectric base, wherein conductive coating is spared in the proximity of two ends of signal pins and two ends of power pins to prevent a short circuit, wherein, with the device placed on the socket, the two or more layers extend vertically from stored pins' top to bottom, and wherein the stored pins are suspended in an upright position directly by the two or more layers.

The present disclosure includes a method of making a socket for semiconductor testing, including: creating vertically patent holes in the socket; coating two or more layers of the socket with a conductive material; and positioning the socket to attach the pins to corresponding receptors of the device, wherein the lowest of the two or more layers can be thinner than 0.2 mm, wherein the stored pins are suspended in an upright position by the two or more layers, wherein the two or more layers are dielectric, and wherein the conductive material coating is spared in the proximity of two ends of power pins and two ends of signal pins.

In one embodiment, the method may further include: adjusting the size of the holes around signal pins in accordance with the desired characteristic impedance of the socket and the size of the signal pins.

As an exemplary implementation of the present disclosure, the method may also comprise saving conductive materials in the area where presence of conductive materials poses a risk of electrical short circuit.

In one embodiment, gold is used for conductive material coating.

In one embodiment, the method may also include: coating with a second conductive material.

In one embodiment, the method may include: in relation to a desired pin pitch, adjusting the uncoated area to realize optimization of signal integrity and minimization of a short circuit.

In another embodiment, the method may include: deciding the thickness of the lowest layer of the socket based on the risk of a short circuit and signal integrity.

In yet another embodiment, the lowest of the two or more layers of the socket is made from Flexible Circuit Board.

Embodiment 3

Figure 17:
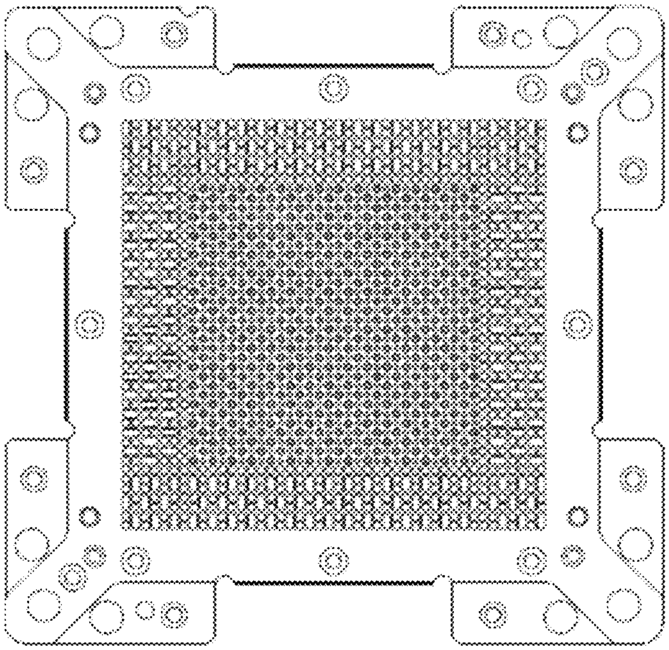

FIG. 17 shows a socket of pins for semiconductor testing implemented within Embodiment 3 of the present invention. As seen in FIG. 17, a socket has a shape that properly accommodates a tested device.

A centrally located rectangular grid is a lattice formed by a plurality of circular holes and oval holes for pins.

The grid may be formed by holes for signal pins and holes for ground pins. Also, there may be holes for power and other kinds of pins.

The signal pins may be lined in one or more neighboring rows. The signal pins may adapt different forms, and include single-ended signal pins and differential signal pins. The precise arrangement of various types of pins is not limited to a particular configuration, a form, an alignment, or a rule. One ordinary skill in the art may employ whatever workable methods for placing pins.

FIG. 17 is a top plan view of one layer of the socket. Because FIG. 17 is a top plan view, openings seen in FIG. 17 correspond to holes in one layer but not necessarily to those in other layers. Layers may have holes and openings in differed shapes and in different locations. However, if there is an opening for a pin at one location in a layer, there are usually openings for the pin at corresponding locations in other layers. The openings in a layer may include gaps between pairs of signal pins.

Figure 19:
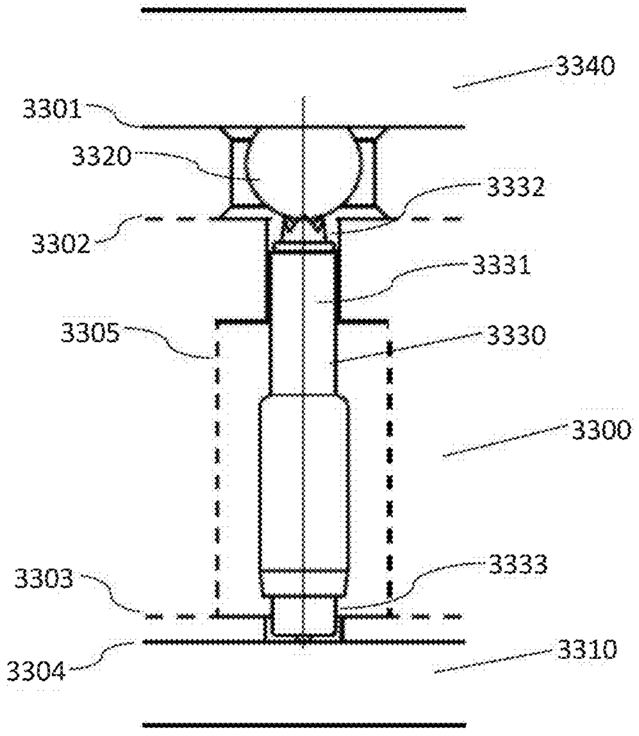

FIG. 19 is a partial vertical cross-sectional view of a socket of the present disclosure 3300, a tested device 3340, a PCB 3310, and a pin 3330. One exemplary distribution of conductive materials in the multi-layer socket is shown as dotted lines as seen in surfaces 3302, 3303, and 3305.

The distribution pattern described in FIG. 19 is meant to serve as a schematic illustration, and not scaled to actual measurements.

In accordance with one embodiment of the present disclosure, the socket 3300 is made from a dielectric material, and copper laminate films may be applied onto surfaces of layers 3302, 3303 of the socket 3300.

In some embodiments, the socket 3300 may be made of glass-reinforced epoxy and coated with copper laminate.

The foundation of the socket 3300 may be made of customizable raw materials that are amply available on the market, and therefore, it is possible to reduce production costs, satisfy tightly set conditions, and create sockets with higher accuracy.

According to one or more embodiments, gold coating may be applied on surfaces (3302, 3303) of a plurality of layers and interior walls 3305 of holes except in the vicinity of two ends of the stored pins (3332, 3333).

The socket manufactured according to one or more embodiments of the present disclosure is found to be superior to or equivalent to existing copper clad laminate sockets in terms of the signal integrity. By structuring metal sockets with gold coating, not only properties such as signal integrity have been enhanced, but also the device safety has been augmented.

The above favorable characteristics are realizable in a diverse range of pins and sockets. The present disclosure may be advantageously implemented in various types of testing devices for high-pitch signal transmission.

In accordance with several embodiments, the high-speed signal transmission is controlled well when the socket is coated with gold without nickel. For example, copper laminate films may be first applied to the dielectric socket, and gold coating may be added next. Copper laminate may be applied by any available method to planes of some of the plurality of layers and interior walls of holes for pins.

The socket of the present disclosure offers effective shields against disruptions in testing signal transmissions, such as crosstalk of neighboring pins.

The improved signal integrity of a shielded IC socket, as described in the foregoing embodiments, may be observable by reduced return loss, TDR impedance, or insertion loss.

In some embodiments of the present disclosure, a shielded pin socket 3300 possesses a comparable safety mechanism even without the sleeve-like structure. Metal is not applied in the proximity of two ends of a pin 3332, 3333. In FIG. 19, dotted lines indicate gold coating.

As shown in FIG. 19, in some embodiments, the socket 3300 may be three layered. The highest layer's top surface 3301 may contact a tested device 3340, and the top surface of the second highest layer 3302 may lie at the same level with the pin's top 3332. The bottom surface of the lowest layer 3304 may lie around the level of the pin's bottom 3333.

The size of the hole changes to hold the pin 3330 at its head 3332 and bottom 3333. For example, the hole is smaller at the pin's upper terminal 3332 and lower terminal 3333 than the pin's middle section 3331. The size of the hole in the middle section may be determined to realize the desired characteristics of the socket.

In one embodiment, the size of the hole may be decided in accordance with the desired characteristic impedance of the system, which can be calculated by the equation below. The characteristic impedance may be decided by the diameter of an outer conductive material (e.g., hole diameter), the diameter of an inner conductive material (e.g., signal pin width), and the relative permittivity of a material between conductors.

$$Z_0 = 138/\sqrt{k}\ \log(d_1/d_2)$$

Figure 18A:
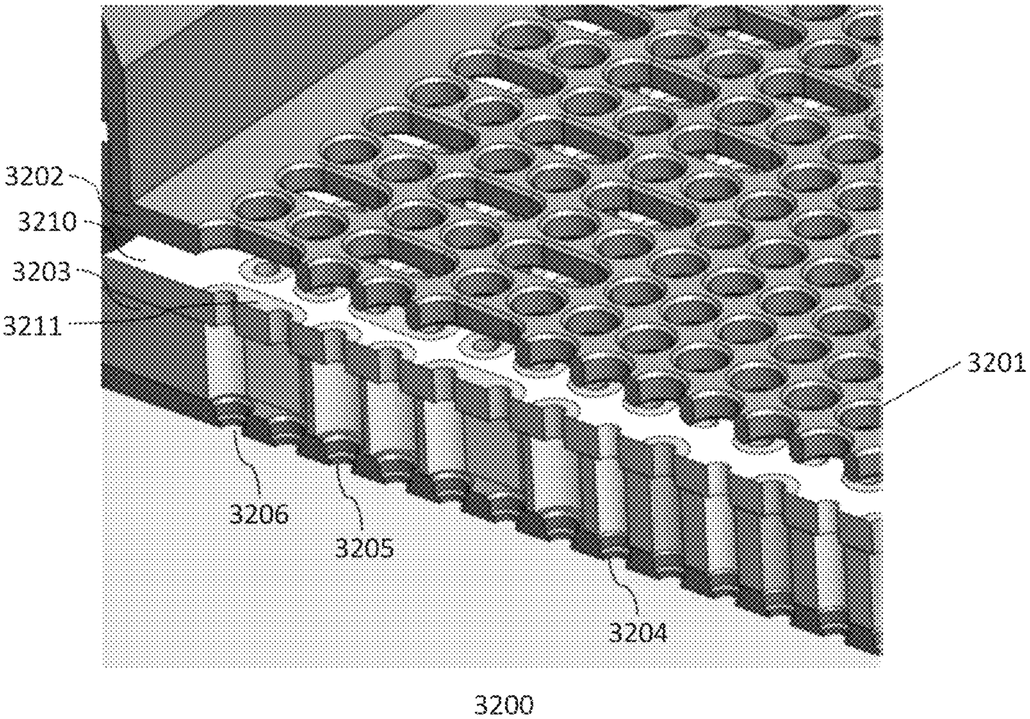
FIG. 18A is a partial enlarged view of one example of a shielded socket, with its highest layer moved apart from lower layers.

$Z_0$: Characteristic impedance of line $d_1$: Inside diameter of outer conductor $d_2$: Outside diameter of inner conductor k: Relative permittivity of insulation between conductors According to several embodiments of the present disclosure, the socket 3201 may be made of a plurality of layers. As shown in FIG. 18A, representative implementations of the present disclosure may include a first hole (3205, 3206)

for a signal pin (3208, 3209), a second hole (3204) for a ground pin (3207), and a third hole for a power pin.

In FIG. 18A, one exemplary pin socket 3201 is shown. FIGS. 18A and 18A do not depict a tested device that is mounted over the socket. Also, the highest layer 3202 of the socket is lifted up from other layers 3203, to better illustrate structures below the highest layer 3202. At the time of testing, layers of the socket may be, brought into contact with each other like the aligned layers shown in FIG. 19.

Figure 18B:
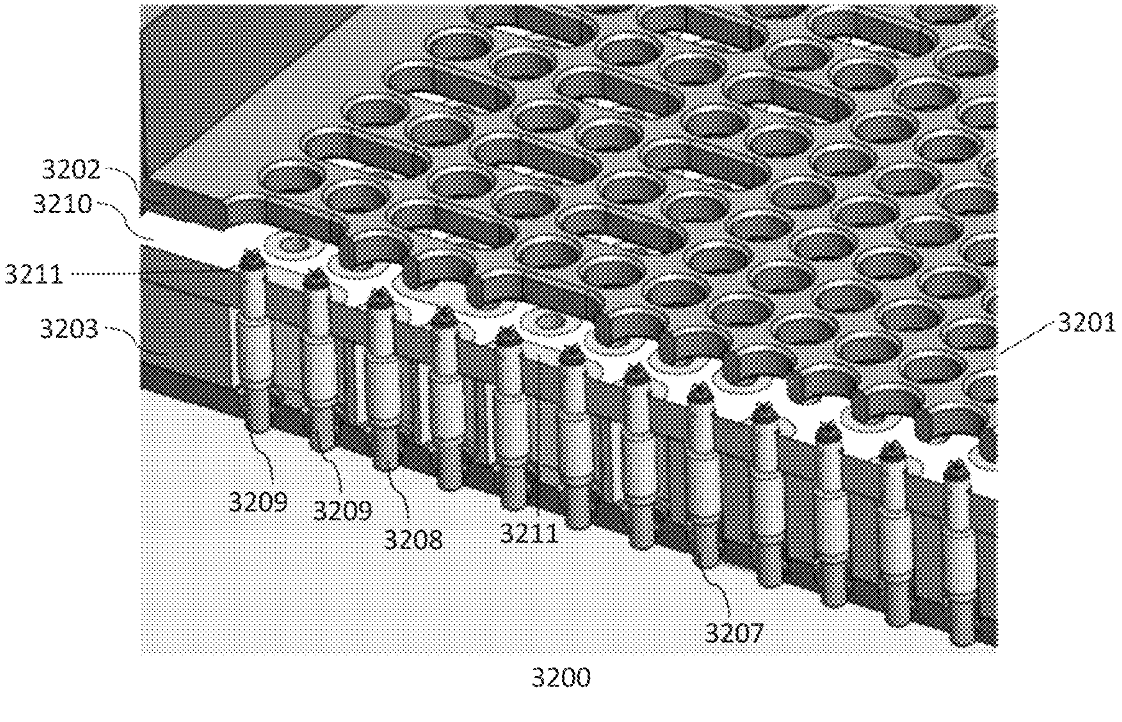
FIG. 18B is a partial enlarged view of one example of a shielded socket with pins, with its highest layer moved apart from lower layers.

As shown in FIGS. 18A and 18B, holes may be aligned linearly, with signal pins (3208, 3209) positioned in peripheral areas of the socket 3201. One wider hole may accommodate two signal pins (3209) in the highest layer 3202, and each signal pin may be accommodated by two separate holes in other layers 3203. However, the configuration of the socket 3201 is not limited to the illustration in FIGS. 8A and 18B and may take any other suitable forms.

As shown in FIG. 18B, in one preferred embodiment, the disclosed co-axial pin socket 3201 may have gold coating on top planes 3210 of layers and on inner walls of pin holes (3204, 3205, 3206). In such embodiment, rims around the holes 3211 at both terminals of signal pins (3208, 3209) are not covered with conductive material. In uncoated areas, the dielectric material of the socket is exposed.

One example of the socket 3201 is illustrated in FIG. 18A. In one preferred embodiment, the highest layer 3202 is saved from conductive material, but a lower layer 3203 has gold coating on the top plane 3210 and the bottom plane.

In yet another embodiment, the highest layer 3202 is not coated with a conductive material while the lower layers are coated with gold on their top planes 3210 and on some of their bottom planes.

According to some preferred embodiments of the present disclosure, conductive material is spared in the vicinity of two terminals 3211 of signal pins (3208, 3209). As one illustrative implementation, FIG. 18B shows that interior walls of holes (3205, 3206) for signal pins (3208, 3209) are covered with gold in the lower layer but locations close to either the top or the bottom of the signal pins (3208, 3209) are not coated with metal.

Figure 20A:
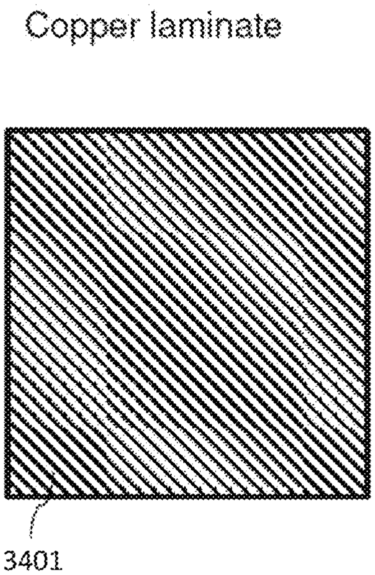
FIGS. 20A through 20I are exploded views of a hole and a layer of the socket, according to one embodiment.
Figure 20B:
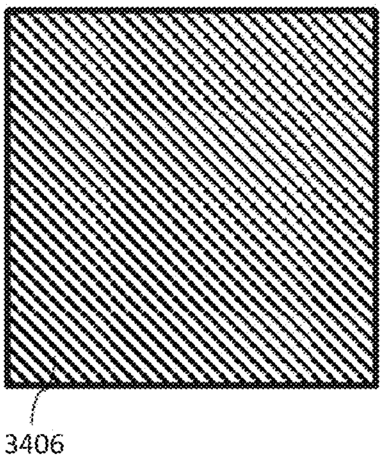

FIG. 20A is an exploded plan view of a layer of the socket covered with copper laminate films, in accordance with one or more embodiments. FIG. 20B is an exploded bottom view of the same layer. While the hole has a circular shape in FIGS. 20A and 4B, the hole may adopt other shapes such as oval and each layer may have differently shaped holes.

In FIGS. 20A to 20I, the striped areas correspond to metal coated areas and the non-striped areas correspond to uncoated areas. In one embodiment of the present disclosure, the socket is made of a non-conductive material (non-striped), and the top plane and the bottom plane of the shown layer may be partially or entirely coated with metal (striped).

In one or more embodiments, copper laminate films and gold coating depicted in FIGS. 20A through 20A are applied to one area of a particular layer based on whether the area is positioned near two ends of a signal pin or two ends of a power pin. If the area is located close to these pins' two terminals, conductive material coating is spared to prevent unwanted disturbance of the signal integrity and prevent a short circuit. As illustrated in FIG. 20G, 20H, 20I, the exemplary hole may be accompanied by an uncoated rim.

Figure 20C:
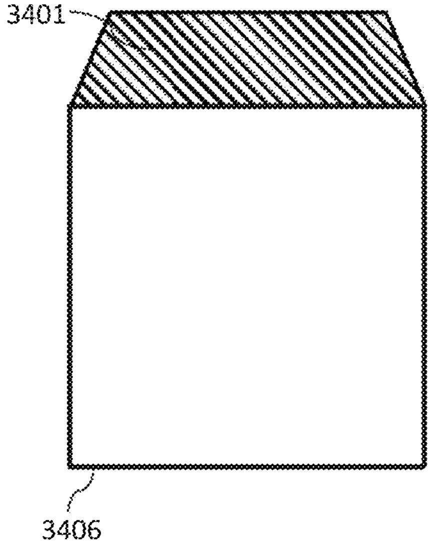

FIG. 20C is an exploded perspective view of a vertical dissection of the same layer.

The application of copper laminate films may be determined depending on several factors, including whether there is a risk of a short circuit.

Figure 20D:
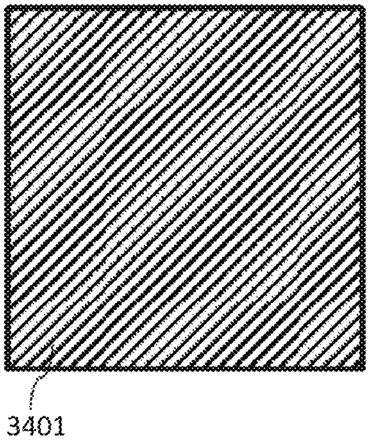
Figure 20E:
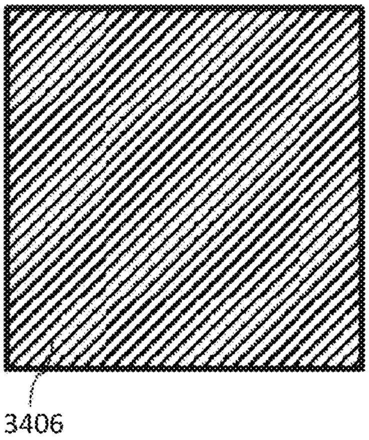
Figure 20F:
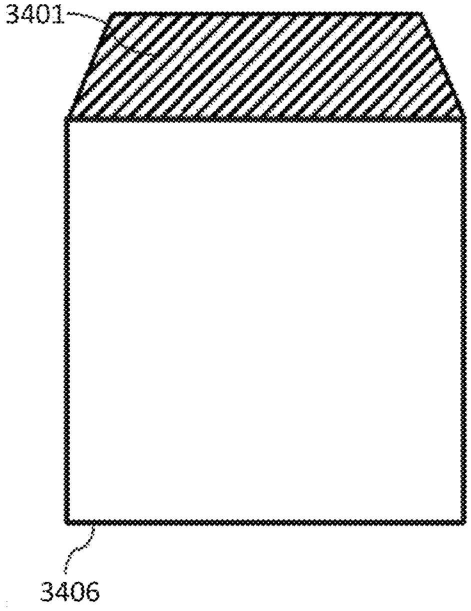
Figure 20G:
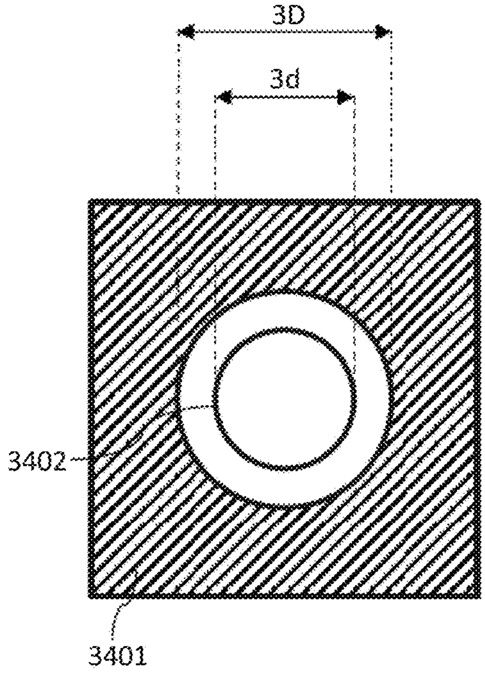
Figure 20H:
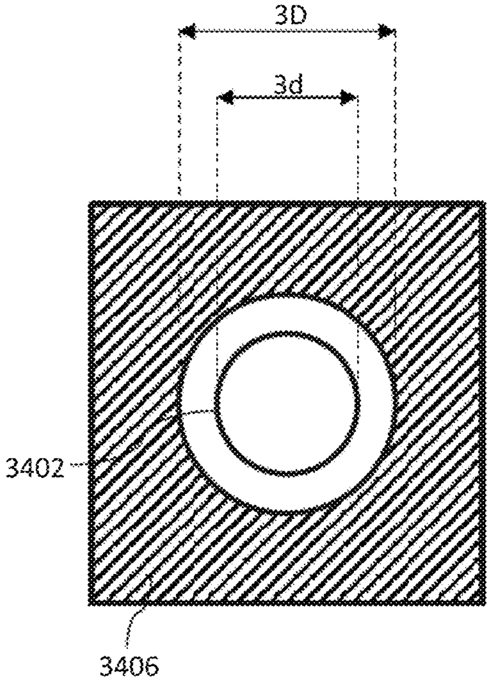
Figure 20I:
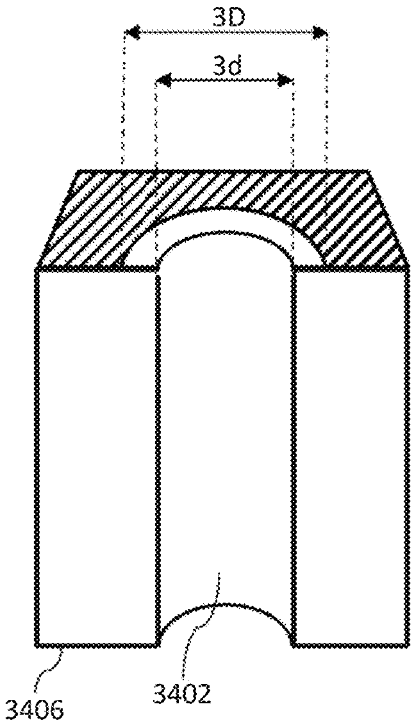

FIG. 20D is an exploded plan view of the layer with gold coating, in accordance with one or more embodiments. FIG. 20E is an exploded bottom view of the same layer. The areas of gold coating 3401, 3406 are observable from the top and the bottom of the layer. FIG. 20F is an exploded perspective view of a vertical dissection of the same layer.

FIG. 20G is an exploded plan view of the layer coated with gold in which a hole for a pin is made. FIG. 20H is an exploded bottom view of the same layer. FIG. 20I is an exploded perspective view of a vertical dissection of the hole. Although the hole in FIG. 20I is shown to be cylindrically shaped, the hole may take an irregular shape, having a non-linear, curved, or stepped inner surface.

The top plane of the shown layer has an area 3401 coated with gold and an uncoated area 3402. Areas located in the vicinity of two terminals of signal pins are generally uncoated 3402.

The width (3D) of the non-coated area 3402 in relation to the diameter of the hole (3d) may be altered in view of the desired properties of the socket and the observed properties of the socket. In some embodiments, the non-coated area 3402 may be adjusted to optimize the signal integrity parameters, such as the pitch of signal pins, the type of the socket base material, as well as the risk of a short in the electric circuitry. The hole's width or diameter (3d) may change from layer to layer.

FIGS. 21A through 21L show the formation of metal coating in a layer in accordance with one embodiment of the present disclosure. The striped areas correspond to metal coated areas and the non-striped areas correspond to uncoated areas.

In one embodiment of the present disclosure, the socket is made of a non-conductive material (non-striped), and the top plane and the bottom plane of the shown layer may be partially or entirely coated with metal (striped). Given that neither the top plane 3501 nor the bottom plane 3506 of the shown layer is positioned near two ends of a signal pin or two ends of a power pin, copper laminate is applied to the top plane and the bottom plane.

Figure 21A:
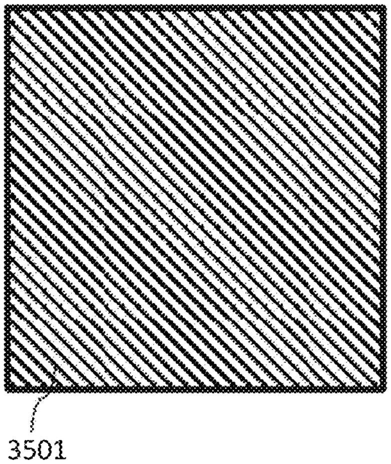
FIGS. 21A through 21L are exploded views of a hole and a layer of the socket, according to one embodiment.
Figure 21B:
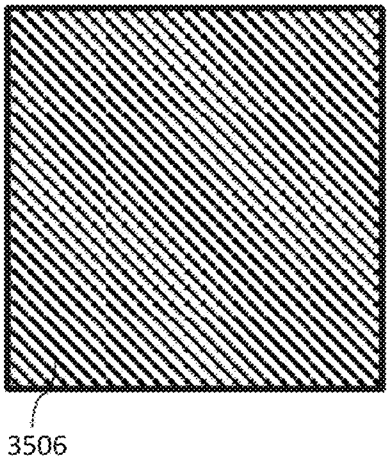
Figure 21C:
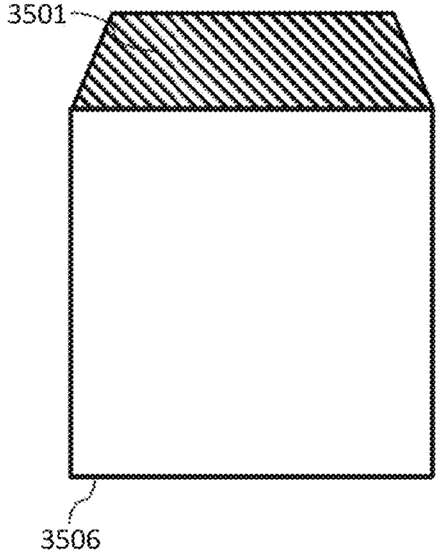
Figure 21D:
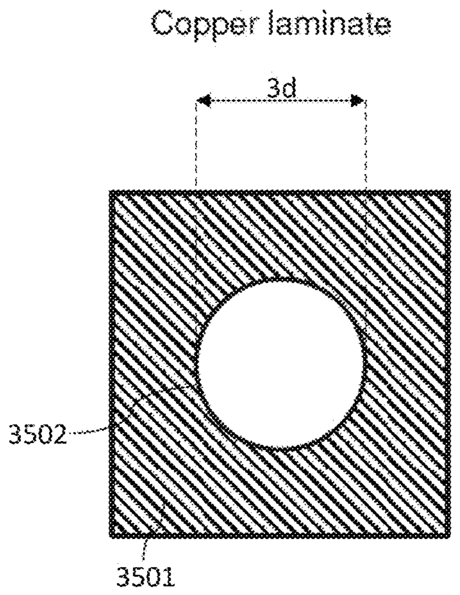
Figure 21E:
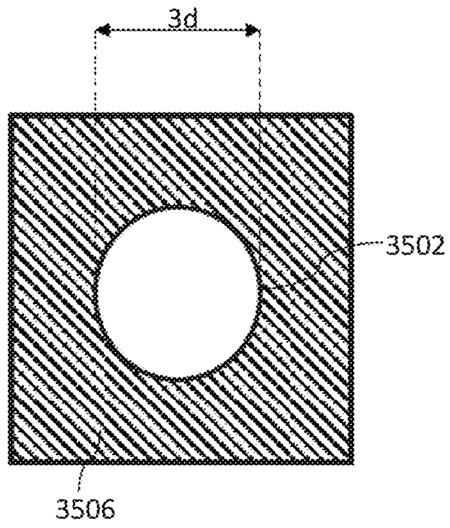
Figure 21F:
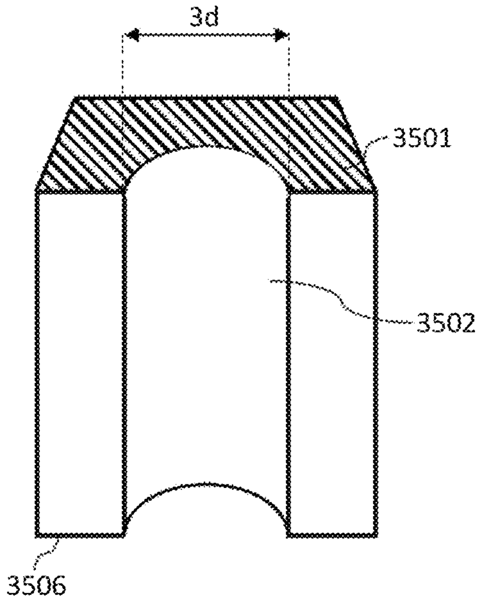
Figure 21G:
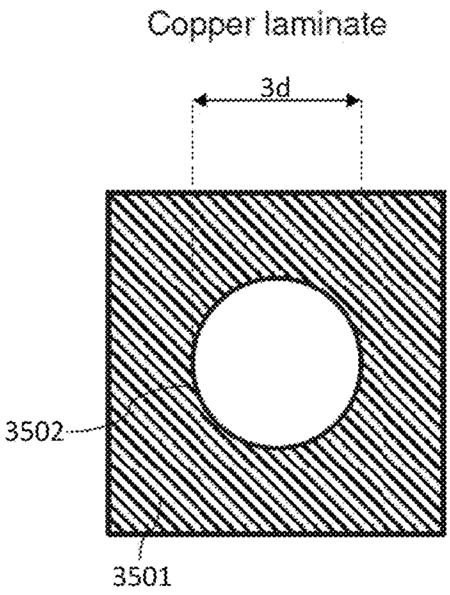
Figure 21H:
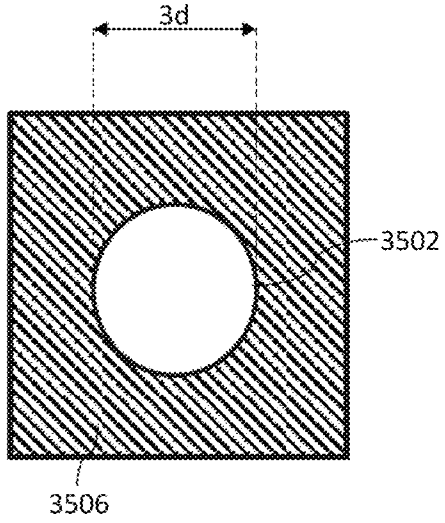
Figure 21I:
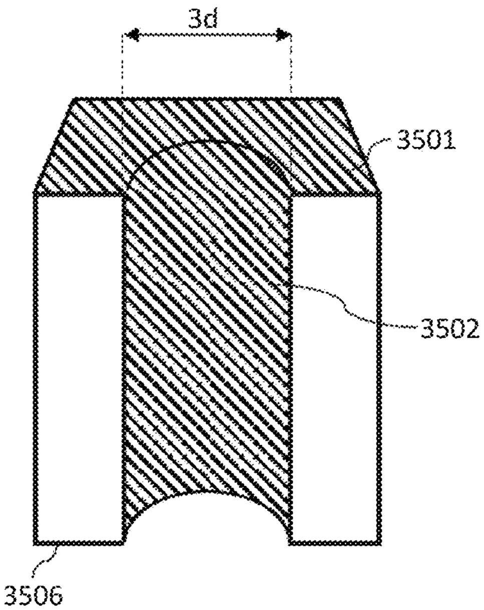
Figure 21J:
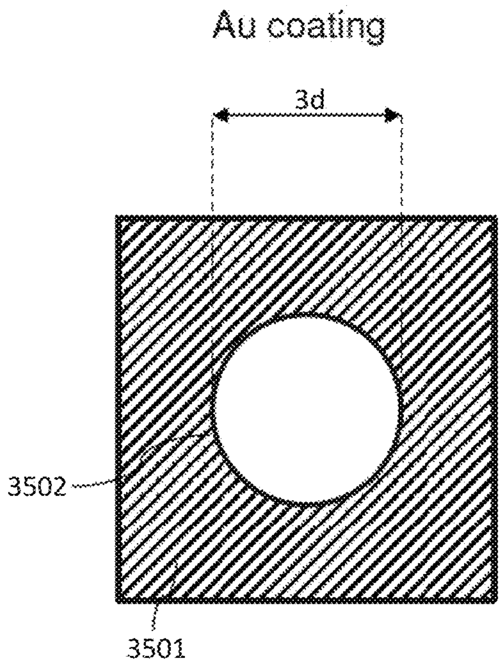
Figure 21K:
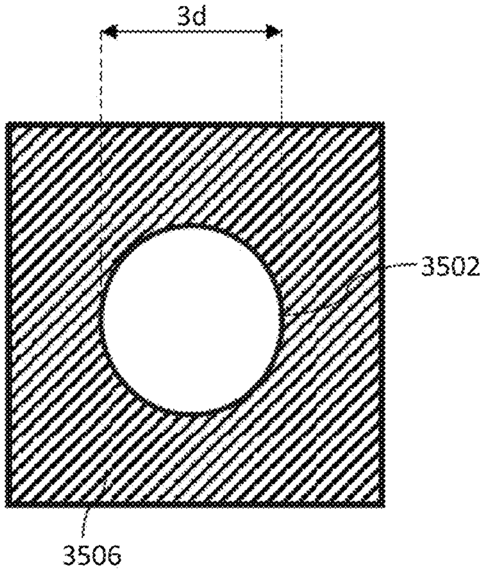
Figure 21L:
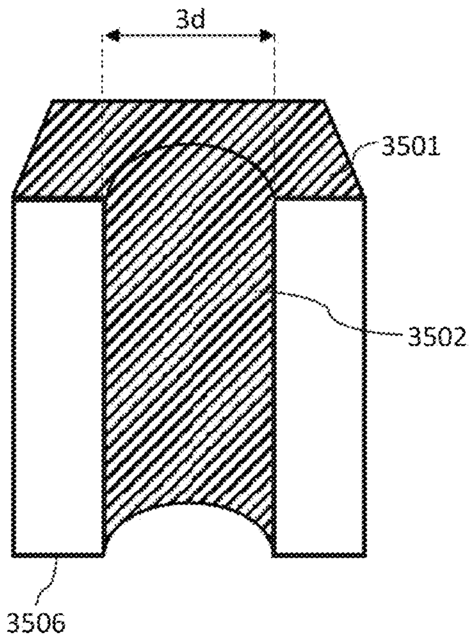

Different from the hole in the socket illustrated in FIGS. 20G, 20H, 20I, the hole illustrated in FIGS. 21J, 21K, 21L, is not accompanied by an uncoated rim when there is only a minimal risk of a short circuit, according to one embodiment of the present disclosure.

FIG. 21A is an exploded plan view of a layer of the socket covered with copper laminate films, in accordance with one or more embodiments. FIG. 21B is an exploded bottom view of the same layer. FIG. 21C is an exploded perspective view of a vertical dissection of the same layer. The areas of copper laminate 3501, 3506 are observable from the top or the bottom of the layer.

The application of copper laminate films may be determined depending on several factors, including whether there is a risk of a short circuit.

FIG. 21D is an exploded plan view of the same layer with a hole for a pin, in accordance with one or more embodiments. FIG. 21E is an exploded bottom view of the same layer. FIG. 21F is an exploded perspective view of a vertical dissection of the same layer.

FIG. 21G is an exploded plan view of the same layer after copper laminate films are extended into the hole. FIG. 21H is an exploded bottom view of the same layer. FIG. 21I is an exploded perspective view of a vertical dissection of the same layer.

FIG. 21J is an exploded plan view of the same layer after gold coating is applied to surfaces. FIG. 21H is an exploded bottom view of the same layer. FIG. 21I is an exploded perspective view of a vertical dissection of the same layer.

The scope of metal coating over areas of the layer is decided by assessing and examining how high the likelihood of signal disruptions and the possibility of a short circuit would be in a socket with metal coating. In one example shown in FIGS. 21J to 21L, the top plane 3501 of the shown layer is entirely coated with gold, and there is no spared area.

Figure 22A:
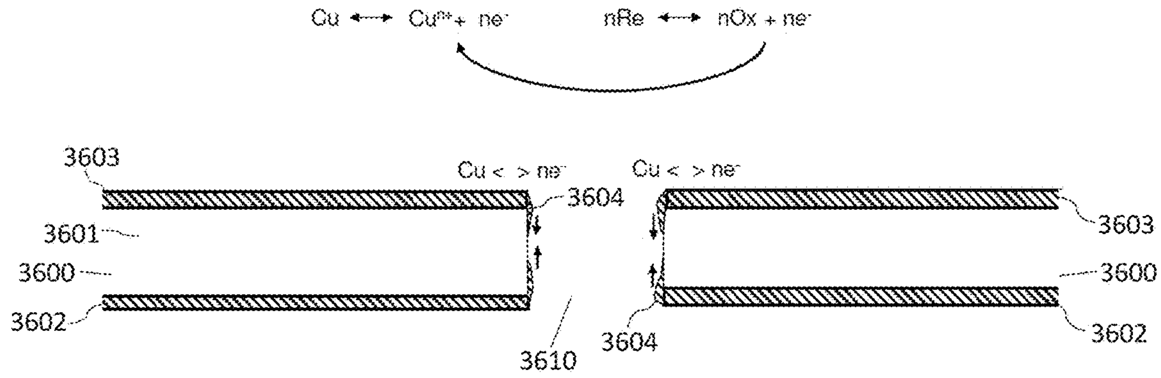
FIG. 22A is a partial vertical cross-sectional view of a layer of the socket, showing the process of copper laminate application over a hole.
Figure 22B:
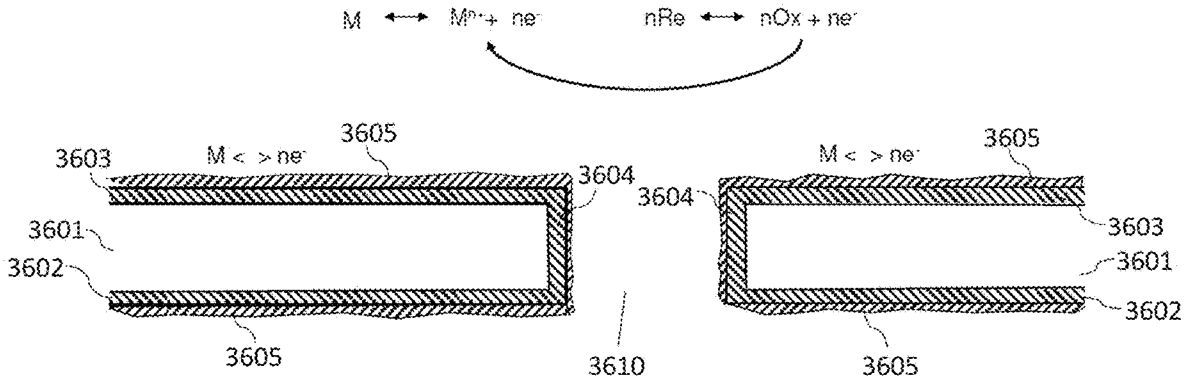
FIG. 22B is a partial vertical cross-sectional view of the same layer, showing the process of gold coating.

FIG. 22A is a partial vertical cross-sectional view of a layer 3600 of the socket as one embodiment, indicating the process of copper laminate film application. FIG. 22B is a partial vertical cross-sectional view of the layer 3600, indicating the process of gold plating.

The layer 3600 of the socket may have dielectric base (3601). Any customizable materials may be used to make the layer's base 3601.

Vertically patent holes 3610 are created in the layer 3600 in locations where pins are stored. The top plane may have copper laminate films 3603, and the bottom plane may also have copper laminate films 3602.

A film of copper 3604 may be formed by electroless copper plating. An ordinary skill in the art may employ any of such known techniques to extend copper laminate film from the top plane or from the bottom plane into walls of the hole 3610

Similarly, a sheet of gold 3605 may be formed on the copper laminate films (3602, 3603, 3604) by electroless plating. As with copper plating, gold plating may be electroless, a self catalytic process. In plating gold, technical difficulties involved in the electrodeposition are largely avoided.

The disclosed gold plating realizes an unparalleled technical advantage for the production of high-quality IC sockets because the process eliminated the need for strictly regulated chemical and physical environments, contrary to commonly used plating processes, nor may it require frequent adjustments of a reaction.

The socket manufactured according to one or more embodiments of the present disclosure is found to be superior to existing sockets in terms of the signal integrity. By forming gold plating over copper laminate, the socket has less signal distortions from electromagnetic interactions, and the signal transmission will be better controlled.

The above favorable characteristics are realizable in a diverse range of pins and sockets. The present disclosure may be advantageously implemented in various types of testing devices for high-pitch signal transmission.

Embodiments of the present disclosure include methods of making an IC socket for testing a device, comprising: creating vertically patent holes for storing pins in the IC socket; forming copper laminate films over layers of the IC socket; plating the copper laminate films with gold; and positioning the IC socket to reversibly attach the pins to corresponding receptors of the device, wherein the socket is made of a dielectric base, wherein metal coating is spared in the proximity of two ends of stored signal pins and two ends of stored power pins, wherein, with the device placed on the IC socket, the layers extend vertically to stored pins' top, but do not extend to stored pins' bottom, and wherein gold plating is electroless plating.

The present disclosure includes a method of making an IC socket for semiconductor testing, including: creating a first hole for a signal pin and a second hole for a ground pin in the IC socket; forming copper laminate films over top and bottom planes of a first group of layers of the IC socket; forming copper laminate films over the first hole and the second hole of a second group of layers of the IC socket; plating the copper laminate films with gold; storing the signal pin in the first hole and the ground pin in the second hole; and positioning all layers of the IC socket to attach the signal pin to a corresponding receptor of the device, wherein metal coating is spared in the proximity of two ends of power pins and two ends of signal pins.

In one embodiment, the method may further include: adjusting the size of the holes around signal pins in accordance with the desired characteristic impedance of the socket and the size of the signal pins.

As an exemplary implementation of the present disclosure, the method may also comprise saving metal coating in the area where presence of conductive materials poses a risk of electrical short circuit.

In one embodiment, gold plating of the disclosed method is autocatalytic.

In one embodiment, the method may include: in relation to a desired pin pitch, adjusting the metal-free area to realize signal integrity and minimize a risk of a short circuit.

In another embodiment, copper laminate films applied to top planes and bottom planes of layers of the IC socket promote formation of copper laminate films over the first hole and the second hole.

[Additional Note]

[Additional Note 1]

A socket for, when in use, electrically connecting an upper first part and a lower second part, the socket includes:

a pin that contacts the first part and the second part;

a main body made of a non-conductive material;

a holder that penetrates the main body vertically and holds the pin; and a conductive layer provided on an inner circumferential surface of the holder to surround the pin.

Note that, the sockets 200, 300, 500*b*, 701, 801, 2300, 2500*b*, 2600, 2700, 3201 of above-mentioned Embodiment are corresponding to the socket of the present invention, respectively.

The pins 202, 307, 308, 309, 502*b*, 806, 807, 808, 809, 902, 2330, 2530, 2630, 2707, 2708, 2709, 3207, 3208, 3209 of above-mentioned Embodiment are corresponding to the pin of the present invention.

The holes 304, 305, 306, 708, 2704, 2705, 2706, 3204, 3205, 3206 of the above-mentioned Embodiment are corresponding to the holder of the present invention.

In above-mentioned Embodiment, the portion of the conductive material coating applied to the inner wall of the hole that holds the signal pins are corresponding to the conductive layer of the present invention.

[Additional Note 2]

The socket according to additional note 1, wherein the pin comprises a signal pin that contacts the first part and the second part, the holder comprises a signal pin holder that holds the signal pin, and the conductive layer comprises a shield part that is grounded and provided on an inner circumferential surface of the signal pin holder to surround the signal pin.

Note that, the pins 308, 309, 806, 807, 2708, 2709, 3208, 3209 of above-mentioned Embodiment are corresponding to the signal pin of the present invention.

The holes 305, 306, 2705, 2706, 3205, 3206 of above-mentioned Embodiment are corresponding to the signal pin holder of the present invention.

[Additional Note 3]

The socket according to additional note 2, wherein the signal pin comprises a pair of differential signal pins that contact the first part and the second part, the signal pin holder comprises a differential signal pin holder that penetrates the main body vertically and holds the pair of differential signal pins altogether, and on an inner circumferential surface of the differential signal pin holder, the shield part is provided to surround the pair of differential signal pins altogether.

Note that, the pins 309, 807, 2708, 3209 of above-mentioned Embodiment are corresponding to the differential signal pin holder of the present invention.

The holes 306, 708, 2706, 3206 of above-mentioned Embodiment are corresponding to the differential signal pin holder of the present invention.

[Additional Note 4]

The socket according to additional note 3, wherein the main body comprises a top plate part and a middle plate part provided below the top plate part, the differential pin holder comprises:

a pair of first smaller diameter holes that are provided to the top plate part and support the pair of differential signal pins; and a first larger diameter hole that is provided to the middle plate part and surrounds middle portions of the pair of differential signal pins, on each inner circumferential surface of the first larger diameter holes, the shield part is provided, while, on an inner circumferential surface of the first smaller diameter hole, the conductive layer is not provided such that the non-conductive material is exposed.

Note that, the layers 703, 803 of above-mentioned Embodiment are corresponding to the top plate part of the present invention.

The layers 704, 804 of above-mentioned Embodiment are corresponding to the middle plate part of the present invention.

[Additional Note 5]

The socket according to additional note 4, wherein the top plate part and the middle plate part are formed integrally.

[Additional Note 6]

The socket according to additional note 4, wherein the pin comprises a ground pin that contacts the first part and the second part, the holder comprises a ground pin holder that penetrates the main body vertically and holds the ground pin, the ground pin holder comprises:

a second smaller diameter hole that are provided to the top plate part and support the ground pin; and a second larger diameter hole that is provided to a middle plate part and surrounds a middle portion of the ground pin, and the conductive layer comprises a ground part that is provided to an inner circumferential surface of the second larger diameter hole and contacts the ground pin.

Note that, the holes 304, 2704, 3204 of above-mentioned Embodiment is corresponding to the ground pin holder of the present invention.

The pins 307, **502*b*, 808*b*, 2707, 3207** of above-mentioned Embodiment are corresponding to the ground pin of the present invention.

[Additional Note 7]

The socket according to additional note 6, wherein the ground part is provided to the inner circumferential surface of the second larger diameter hole and inner circumferential surface of the second smaller diameter holes.

[Additional Note 8]

The socket according to additional note 6, wherein the ground pin comprises a top plunger provided at an upward side and a coil spring that is provided below the top plunger and biases the top plunger, and the coil spring contacts the ground part.

The plunger 503, 906 of above-mentioned Embodiment is corresponding to the top plunger of the present invention.

The springs 504, 904 of above-mentioned Embodiment are corresponding to the coil spring of the present invention.

[Additional Note 9]

The socket according to additional note 8, wherein the coil spring contacts the ground part at two locations including an upper end portion and a lower end portion.

[Additional Note 10]

The socket according to additional note 2, wherein the pin further comprises a power pin that contacts the first part and the second part, the holder comprises a power pin holder that penetrates the main body vertically and holds the power pin, and on an inner circumferential surface of the power pin holder, the conductive layer is not provided such that the non-conductive material is exposed.

The power pin 809 of above-mentioned Embodiment is corresponding to the power pin of the present invention.

[Additional Note 11]

The socket according to additional note 2, wherein the signal pin comprises a single-ended signal pin that contacts the first part and the second part, the signal pin holder comprises a single-ended signal pin holder that penetrates the main body vertically and holds the single-ended signal pin, and on an inner circumferential surface of the single-ended signal pin holder, the shield part is provided to surround the single-ended signal pin.

Note that, the signal pin 308, 806, 2708, 3208 of above-mentioned Embodiment are corresponding to the single-ended signal pin of the present invention.

The hole 305, 2705, 3205 of above-mentioned Embodiment are corresponding to the single-ended signal pin holder of the present invention.

[Additional Note 12]

The socket according to additional note 4, wherein the main body further comprises a floating plate part that is formed such that the first part can be placed thereon and that is supported to be vertically movable above the top plate part, the floating plate part comprises an accommodating part that penetrates the floating plate part vertically and accommodates a pair of differential signal terminals of the first part altogether, the differential signal terminals being contacting the pair of differential signal pins when in use, and on the floating plate part, the conductive layer is not provided such that the non-conductive material is exposed.

Note that, the highest layer 302, 702, 802, 2702, 3203 of above-mentioned Embodiment are corresponding to the floating plate part of the present invention.

[Additional Note 13]

The socket according to additional note 2, wherein the conductive layer comprises a nickel layer provided on a surface of the main body and a gold layer provide on the nickel layer.

[Additional Note 14]

The socket according to additional note 4, wherein a sheet member provided to face a bottom surface of the main body and comprises an electrode that contacts the signal pin and the second part.

Note that, the layer 602 of above-mentioned Embodiment 2 is corresponding to the sheet member of the present invention.

What is claimed is:

1. A socket for electrically connecting an upper first part and a lower second part, the socket comprising:

a pin configured to contact the first part and the second part;

a non-conductive main body made of a non-conductive material, in which a penetrating hole is formed to penetrate the non-conductive main body vertically and function as a holder configured to hold the pin; and a conductive layer made of a conductive material, provided on an inner circumferential surface of the penetrating hole to surround the pin.

2. The socket according to claim 1, wherein the pin comprises a signal pin configured to contact the first part and the second part, the holder comprises a signal pin holder configured to hold the signal pin, and the conductive layer comprises a shield part that is grounded and provided on the inner circumferential surface of the penetrating hole as the signal pin holder to surround the signal pin.

3. The socket according to claim 2, wherein the signal pin comprises a pair of differential signal pins configured to contact the first part and the second part, the signal pin holder comprises a differential signal pin holder configured to hold the pair of differential signal pins together, and on the inner circumferential surface of the penetrating hole as the differential signal pin holder, the shield part is provided to surround the pair of differential signal pins altogether.

4. The socket according to claim 3, wherein the main body comprises a top plate part and a middle plate part provided below the top plate part, the differential pin holder comprises:

a pair of first smaller diameter holes that are provided to the top plate part and support the pair of differential signal pins; and a first larger diameter hole that is provided to the middle plate part and surrounds middle portions of the pair of differential signal pins, on the inner circumferential surface of the penetrating hole as each of the first larger diameter holes, the shield part is provided, while, on the inner circumferential surface of the penetrating hole as the first smaller diameter hole, the conductive layer is not provided such that the non-conductive main body is exposed.

5. The socket according to claim 4, wherein the top plate part and the middle plate part are formed integrally.

6. The socket according to claim 4, wherein the pin comprises a ground pin configured to contact the first part and the second part, the holder comprises a ground pin holder configured to hold the ground pin, the ground pin holder comprises:

a second smaller diameter hole that are provided to the top plate part and support the ground pin; and a second larger diameter hole that is provided to a middle plate part and surrounds a middle portion of the ground pin, and the conductive layer comprises a ground part that is provided on the inner circumferential surface of the penetrating hole as the second larger diameter hole and to contact the ground pin.

7. The socket according to claim 6, wherein the ground part is provided on the inner circumferential surface of the penetrating hole as the second larger diameter hole and on the inner circumferential surface of the penetrating hole as the second smaller diameter holes.

8. The socket according to claim 6, wherein the ground pin comprises a top plunger provided at an upward side and a coil spring that is provided below the top plunger and to bias the top plunger, and the coil spring contacts the ground part.

9. The socket according to claim 8, wherein the coil spring is configured to contact the ground part at two locations including an upper end portion and a lower end portion.

10. The socket according to claim 2, wherein the pin further comprises a power pin configured to contact the first part and the second part, the holder comprises a power pin holder configured to hold the power pin, and on the inner circumferential surface of the penetrating hole as the power pin holder, the conductive layer is not provided such that the non-conductive main body is exposed.

11. The socket according to claim 2, wherein the signal pin comprises a single-ended signal pin configured to contact the first part and the second part, the signal pin holder comprises a single-ended signal pin holder configured to hold the single-ended signal pin, and on the inner circumferential surface of the penetrating hole as the single-ended signal pin holder, the shield part is provided to surround the single-ended signal pin.

12. The socket according to claim 4, wherein the main body further comprises a floating plate part that is formed such that the first part can be placed thereon and that is supported to be vertically movable above the top plate part, the floating plate part comprises an accommodating part disposed to penetrate the floating plate part vertically and configured to accommodate a pair of differential signal terminals of the first part altogether, the differential signal terminals being contacting the pair of differential signal pins when in use, and on the floating plate part, the conductive layer is not provided such that the non-conductive main body is exposed.

13. The socket according to claim 2, wherein the conductive layer comprises a nickel layer provided on a surface of the non-conductive main body and a gold layer provided on the nickel layer.

14. The socket according to claim 2, wherein a sheet member provided to face a bottom surface of the non-conductive main body and comprises an electrode configured to contact the signal pin and the second part.

15. The socket according to claim 1, wherein a plurality of penetrating holes are formed in the non-conductive main body to penetrate the non-conductive main body and function as the holder, and a wall configured to partition penetrating holes next to each other comprises: an inner wall included in the non-conductive main body and made of the non-conductive material; and a pair of the conductive layers disposed to sandwich the inner wall from both sides of the penetrating holes next to each other in a vertical cross-section view.

16. The socket according to claim 1, wherein a wall configured to define an accommodating space for the pin in the penetrating hole comprises: an inner wall included in the non-conductive main body and made of the non-conductive material; and the conductive layer disposed to cover a surface of the inner wall which is the inner circumferential surface of the non-conductive main body.

17. The socket according to claim 1, wherein a plurality of penetrating holes are formed in the non-conductive main body to penetrate the non-conductive main body and function as the holder, and each of the plurality of penetrating holes comprises: an upper part and a lower part in each of which the inner circumferential surface is formed with a smaller diameter to support a top and a bottom of the pin; and a middle part in which the inner circumferential surface is formed with a larger diameter compared to the upper part and the lower part, and in each of the plurality of penetrating holes, the conductive layer is not provided on the inner circumferential surface of the lower part but is provided on the inner circumferential surface of the upper part and/or the middle part in accordance with a kind of the pin.

18. The socket according to claim 17, wherein in a first one of the plurality of penetrating holes where the kind of the pin to be held is a signal pin, the conductive layer is provided on the inner circumferential surface of the middle part, in a second one of the plurality of penetrating holes where the kind of the pin to be held is a ground pin, the conductive layer is provided on the inner circumferential surface of the upper part and the middle part, and in a third one of the plurality of penetrating holes where the kind of the pin to be held is a power pin, the conductive layer is not provided on the inner circumferential surface of the upper part nor the middle part.

* * * * *